United States Patent
Pohl et al.

(10) Patent No.: US 10,679,368 B2
(45) Date of Patent: Jun. 9, 2020

(54) METHODS AND APPARATUS TO REDUCE DEPTH MAP SIZE IN COLLISION AVOIDANCE SYSTEMS

(71) Applicant: Intel IP Corporation, Santa Clara, CA (US)

(72) Inventors: Daniel Pohl, Puchheim (DE); Markus Achtelik, Deutsch (DE)

(73) Assignee: Intel IP Corporation, Santa Clara, CA (US)

( * ) Notice: Subject to any disclaimer, the term of this patent is extended or adjusted under 35 U.S.C. 154(b) by 256 days.

(21) Appl. No.: 15/851,127

(22) Filed: Dec. 21, 2017

(65) Prior Publication Data

US 2019/0051007 A1    Feb. 14, 2019

(51) Int. Cl.
| | |
|---|---|
| G06T 7/55 | (2017.01) |
| G06T 7/73 | (2017.01) |
| H04N 19/176 | (2014.01) |
| G08G 5/04 | (2006.01) |
| G06T 3/40 | (2006.01) |
| B64C 39/02 | (2006.01) |

(52) U.S. Cl.
CPC .............. *G06T 7/55* (2017.01); *B64C 39/024* (2013.01); *G06T 3/40* (2013.01); *G06T 7/74* (2017.01); *G08G 5/04* (2013.01); *H04N 19/176* (2014.11); *G06T 2207/10028* (2013.01); *G08G 5/045* (2013.01)

(58) Field of Classification Search
CPC ........ G08G 5/045; G08G 5/04; B64C 39/024; G06T 7/55; G06T 2207/10028; G06T 3/40; G06T 7/74; H04N 19/176
See application file for complete search history.

(56) References Cited

U.S. PATENT DOCUMENTS

| | | | |
|---|---|---|---|
| 9,778,662 B2 * | 10/2017 | Tang | G05D 1/101 |
| 2013/0009955 A1 * | 1/2013 | Woo | G06T 5/005 |
| | | | 345/419 |

(Continued)

OTHER PUBLICATIONS

Smirnov et al., "Methods for depth-map filtering in view-plus-depth 3D video representation," EURASIP Journal on Advances in Signal Processing, published Feb. 14, 2012, retrieved from [https://asp-eurasipjournals.springeropen.com/articles/10.1186/1687-6180-2012-25] on Dec. 21, 2017, 41 pages.

(Continued)

*Primary Examiner* — Yon J Couso
(74) *Attorney, Agent, or Firm* — Hanley, Flight & Zimmerman, LLC

(57) ABSTRACT

Methods and apparatus to reduce a depth map size for use in a collision avoidance system are described herein. Examples described herein may be implemented in an unmanned aerial vehicle. An example unmanned aerial vehicle includes a depth sensor to generate a first depth map. The first depth map includes a plurality of pixels having respective distance values. The unmanned aerial vehicle also includes a depth map modifier to divide the plurality of pixels into blocks of pixels and generate a second depth map having fewer pixels than the first depth map based on distance values of the pixels in the blocks of pixels. The unmanned aerial vehicle further includes a collision avoidance system to analyze the second depth map.

20 Claims, 14 Drawing Sheets

(56) References Cited

U.S. PATENT DOCUMENTS

2017/0177937 A1* 6/2017 Harmsen ................ G06T 7/579
2017/0301109 A1* 10/2017 Chan ..................... G06K 9/0063
2018/0032042 A1* 2/2018 Turpin ................... G05B 21/02

OTHER PUBLICATIONS

Le et al., "Directional Joint Bilateral Filter for Depth Images," Sensors (Basel), Jul. 2014, 14(7), retrieved from [https://www.ncbi.nlm.nih.gov/pmc/articles/PMC4168506/] on Dec. 21, 2017, 12 pages.
Guenter et al. "Foveated 3D Graphics," Microsoft Research, Nov. 20, 2012, retrieved from [https://www.microsoft.com/en-us/research/publication/foveated-3d-graphics/] on Dec. 21, 2017, 13 pages.

* cited by examiner

METHODS AND APPARATUS TO REDUCE DEPTH MAP SIZE IN COLLISION AVOIDANCE SYSTEMS

FIELD OF THE DISCLOSURE

This disclosure relates generally to collision avoidance systems, and, more particularly, to methods and apparatus to reduce depth map size in collision avoidance systems.

BACKGROUND

Unmanned aerial vehicles (UAVs), commonly referred to as drones, are becoming more readily available and have developed into a rapidly growing market. UAVs are now being used in a wide variety of industries, such as farming, shipping, forestry management, surveillance, disaster scenarios, gaming, etc. Some UAVs employ collision avoidance systems that help control the UAV if a potential collision is detected. The collision avoidance system analyzes depth maps from one or more depth sensors to determine the location of object(s) near the UAV.

BRIEF DESCRIPTION OF THE DRAWINGS

The figures are not to scale. Instead, the thickness of the layers or regions may be enlarged in the drawings. In general, the same reference numbers will be used throughout the drawing(s) and accompanying written description to refer to the same or like parts.

DETAILED DESCRIPTION

Figure 1:
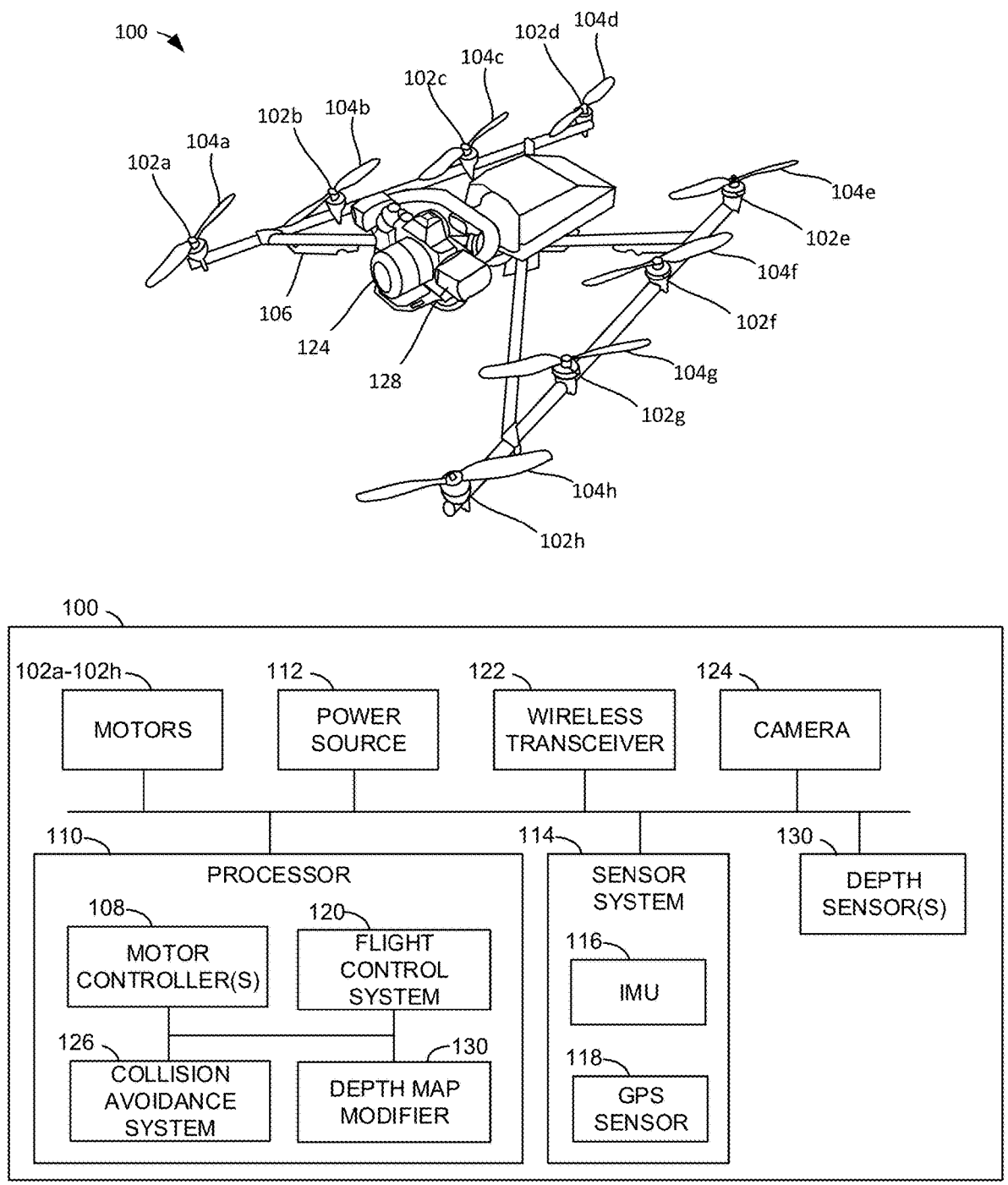
FIG. 1 illustrates an example unmanned aerial vehicle (UAV) having an example depth map modifier constructed in accordance with teachings of this disclosure.

Disclosed herein are example methods, apparatus, systems, and articles of manufacture for reducing (downsizing) depth maps for analysis by a collision avoidance system. Collision avoidance systems (sometimes referred to as object detection systems) are commonly used on unmanned aerial vehicles (UAVs) to monitor the surroundings of a UAV and prevent the UAV from colliding with an object, such as a tree, a building, a vehicle, etc. A collision avoidance system analyzes depth maps generated by a depth sensor. Depth maps, sometimes referred to as depth images, are produced with relatively high resolution, such as 848×480 pixels. However, processing over 400,000 pixels for every depth map, which may occur at a frequency of 30 or 60 Hertz (Hz), can be quite taxing on a microprocessor of a UAV. As such, larger, heavier, more robust processors are required to analyze the depth maps, which may be less desirable or feasible in a UAV.

Disclosed herein are example depth map modifiers that may be used to reduce the size of the depth maps provided to a collision avoidance system while still maintaining relevant data within the depth maps. Example depth map modifiers disclosed herein may utilize one or more example downsizing techniques to downsize the depth maps and reduce the overall data in each depth map. As a result, the downsized depth maps require fewer calculations to process by the collision avoidance system, thereby enabling the smaller, lighter, lower power processors to be utilized for performing the collision avoidance operations, which is desirable on UAVs and other vehicles.

Also disclosed herein are example foveated filter techniques to retain more or fewer pixels in certain areas of a depth map based on an orientation and current direction of travel of a UAV. For example, if a UAV is flying in a forward direction, then the location of objects in front of the UAV may be more important than objects to the sides and/or behind the UAV. In some examples, the depth map modifier applies a first size filter block capable or retaining relatively more detail in areas in the depth map that are of higher importance, and a second size filter block to areas in the depth map that are of lower importance, where detail is not as important. Such an example technique helps further reduce the amount of data included in the depth maps and, thus, reduces the computational load imparted on the collision avoidance system.

While examples disclosed herein are described in connection with a collision avoidance system implemented by a rotorcraft UAV, examples disclosed herein may likewise be implemented in connection with collision avoidance systems in other types of vehicles, such as fixed wing UAVs, manned aircraft, on-road vehicles, off-road vehicles, submarines, etc. Thus, examples disclosed herein are not limited to UAVs. Examples disclosed herein can be broadly used in other applications to similarly reduce computational loads on a collision avoidance system or any other type of system that uses depth maps.

FIG. 1 illustrates an example unmanned aerial vehicle (UAV) 100 in which examples disclosed herein may be implemented. The UAV 100 is shown twice in FIG. 1, once as a UAV and once by a block diagram. In the illustrated example, the UAV 100 is a rotorcraft having eight propeller motors 102a-102h for driving eight rotor blades 104a-104h, respectively, to generate thrust. The motors 102a-102h are carried by an airframe or fuselage 106. While in the illustrated example the UAV 100 includes eight motors and rotors, in other examples, the UAV may include more (e.g., nine, ten, etc.) or fewer (e.g., seven, six, etc.) motors and rotors. For example, the UAV 100 may be a quadcopter having four rotors.

The speeds of the motors 102a-102h are controlled by one or more motor controller(s) 108, sometimes referred to a motor driver(s). In the illustrated example, the motor controller(s) 108 are implemented by a processor 110 of the UAV 100. The motor controller(s) 108 apply power (e.g., via a pulse width modulation (PWM) signal) to control the speeds of the motors 102a-102h and, thus to generate more or less thrust. In the illustrated example of FIG. 2, the UAV 100 includes a power source 112 to provide power to drive the motors 102a-102h and power the other components of the UAV 100 (e.g., a wireless transceiver 122, a camera 124, etc.). The power source 112 may be, for example, a battery. In other examples, other types of power sources may be implemented. In this example, the motors 102a-102h are electric motors. However, in other examples, the UAV 100 may include other types of thrust generators (e.g., a fuel powered motor, a fuel powered jet engine, etc.) in addition to or as an alternative to the electric motors 102a-102h.

In the illustrated example, the UAV 100 includes a sensor system 114 including one or more sensors for detecting the orientation, position, and/or one or more other parameters of the UAV 100. In the illustrated example, the sensor system 114 includes an inertial measurement unit (IMU) 116. The IMU 116 may include one or more sensors that measure linear and/or angular velocities and accelerations to determine orientation, position, velocity, and/or acceleration of the UAV 100. For example, the IMU 208 may include a solid-state accelerometer, a gyro, a magnetometer, a static or dynamic pressure sensor, and/or any other IMU. In the illustrated example, the sensor system 114 includes a Global Position System (GPS) sensor 118 to detect GPS signals and determine the position (location), velocity, and/or acceleration of the UAV 100.

In the illustrated example, the UAV 100 includes a flight control system 120 that is implemented by the processor 110. The flight control system 120 is configured to control the flight of the UAV 100. In particular, the flight control system 120 sends commands or instructions to the motor controller(s) 108 to control the speeds of the motors 102a-120h of the UAV 100 in accordance with a desired flight path. The flight control system 120 uses inputs from the sensor system 114 to maintain the UAV 100 in a desired location or fly the UAV 100 along a desired path. In some examples, the flight control system 120 controls the flight of the UAV 100 based on one or more commands from a manual controller, for example, such as a remote control operated by a human pilot. In the illustrated example, the UAV 100 includes a wireless transceiver 122, which operates as a receiver and a transmitter, to communicate wirelessly with a ground controller and/or another component of an aerial system (e.g., an unmanned aerial system (UAS)). The wireless transceiver 122 may be a low frequency radio transceiver, for example. In other examples, other types of transceivers may be implemented. Additionally or alternatively, the flight control system 120 may control the flight of the UAV 100 based on one or more autonomous navigation operations. In the illustrated example of FIG. 1, the UAV 100 also includes a camera 124 that may be used to record images and/or video. In some examples, the camera 124 is carried by the UAV 100 via a gimbal to enable the camera 124 to turn relative to fuselage 106.

In the illustrated example, the UAV 100 includes a collision avoidance system 126 that is implemented by the processor 110. The collision avoidance system 126 analyzes depth maps from one or more depth sensor(s) 128 to track objects in the area surrounding the UAV 100. In particular, the collision avoidance system 126 analyzes the depth maps to monitor for a potential collision with an object (e.g., a building, a tree, a vehicle, etc.). If the collision avoidance system 126 detects a potential collision, the collision avoidance system 126 instructs (or overrides) the flight control system 120 to take an appropriate course of action, such as decreasing the velocity of the UAV 100, changing the trajectory of the UAV 100, changing the altitude of the UAV 100, sending an alert to a remote controller, etc. For example, if the collision avoidance system 126 determines an object in the field of view is within a threshold distance (e.g., 1m) from the UAV 100, the collision avoidance system 126 may prohibit the UAV 100 from flying in that direction.

In the illustrated example, one depth sensor 128 is depicted, which is carried on the UAV 100 adjacent the camera 124. The depth sensor 128 is facing forward and measures the area in front of the UAV 100. In other examples, as disclosed in further detail herein, the UAV 100 may include more than one depth sensor and/or the depth sensor(s) may be positioned to face other directions (e.g., rearward, upward, etc.). The depth sensor 128 may include one or more devices, such as one or more cameras (e.g., a stereo vision system including two or more cameras, a Time-of-Flight (TOF) camera, which is a sensor that can measure the depths of scene points by illuminating the scene with a controlled laser or LED source and analyzing the reflected light, etc.), an infrared laser, and/or any other device that obtains measurements using any type of detection system such as visual, sonar, radar, lidar, etc. The depth sensor 128 generates depth maps (sometimes referred to depth images) based on objects in the field of view. In some examples, the depth sensor 128 generates depth maps at a frequency of 60 Hz (i.e., 60 depth maps are generated every second). However, in other examples, the depth sensor 128 may generate depth maps at a higher or lower frequency. Therefore, in some examples, the depth sensor 128 provides means for obtaining a depth map.

In some examples, a depth map includes a plurality of pixels (digital values). Each pixel may be a data element or vector (e.g., a 16 bit string) defining a location of the respective pixel and a distance or depth value associated with the respective pixel. The location may be defined using a two-dimensional (2d) coordinate system (with coordinates X and Y), for example. The distance values represent the distances between the depth sensor 128 and surface(s) in the field of view corresponding to the respective pixels. In some examples, the distance values are defined by values ranging from 0 to 65,535 (corresponding to the unsigned numbers of a 16 bit integer), where 0 means no depth (or an invalid value or a preset minimum from the depth sensor 128 (e.g., 10 cm), 100 means 10 centimeters (cm), 1,000 means 1 m, and 65,535 means 65.535 m. In other examples, distance values may be defined using other numbering schemes (e.g., a 32 bit integer may have a floating point from 0.0 to numbers higher than 65,353, within the precision limits of floating point accuracy).

Figure 2:
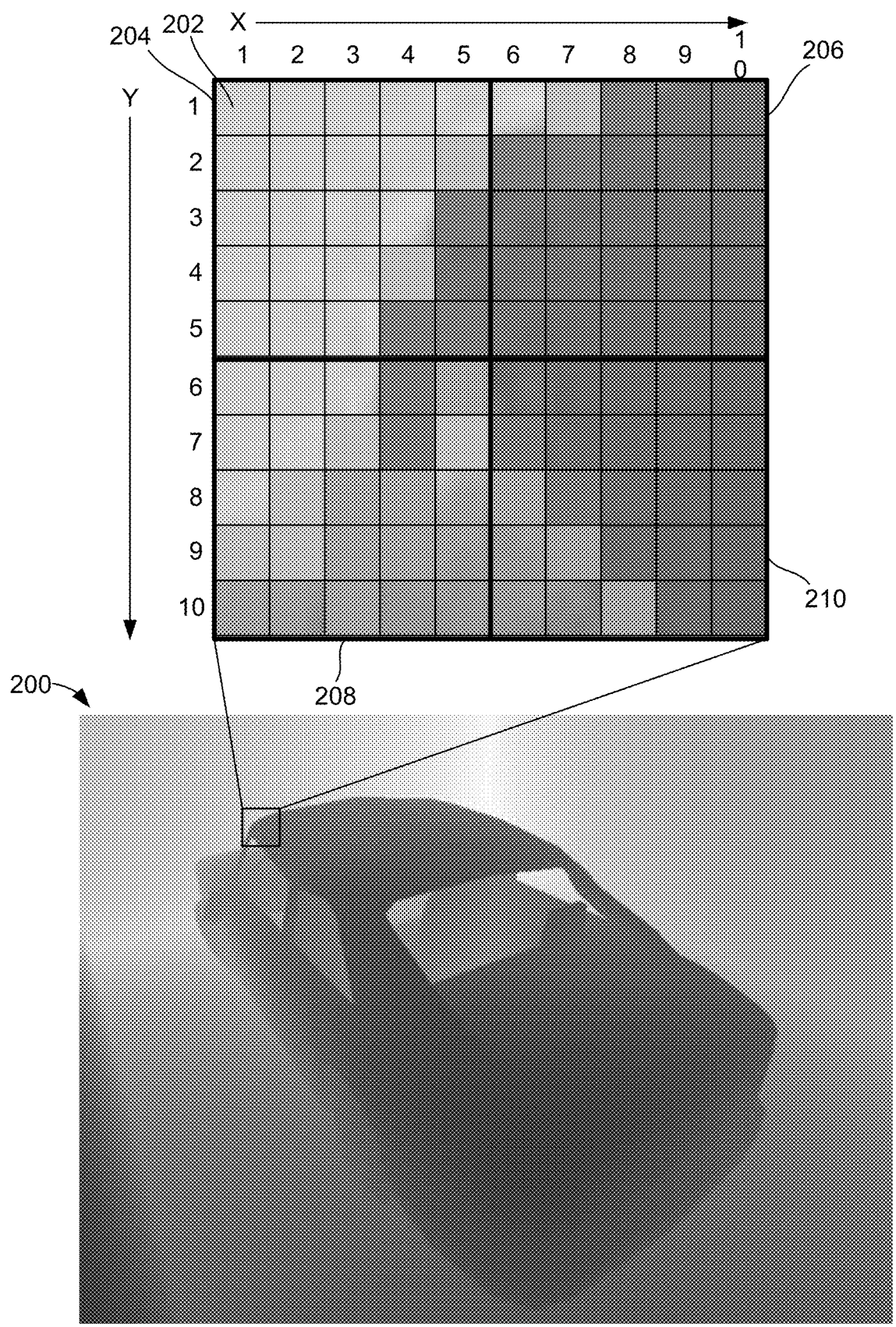
FIG. 2 illustrates an example two-dimensional (2D) image representation of an example depth map obtained by an example depth sensor of the example UAV of FIG. 1.

FIG. 2 shows an example 2D image representation 200 of an example depth map that may be generated by the depth sensor 128. The 2D image representation 200 shows an example vehicle. As disclosed above, the depth map includes an array of pixels, with each pixel including a respective location and associated distance (depth) value. The locations may be defined based on a coordinate system. For example, an enlarged section of the 2D image representation 200 illustrating a plurality of pixels 202 (one of which is labeled) is shown in the callout in FIG. 2. In this example, the pixels 202 are numbered using an XY coordinate system. For sake of example, the X axis has been numbered starting with 1 for the left most column, and the Y axis has been numbered starting with 1 for the top row. However, it is understood that the coordinate system may extend in any direction (left, right, up, down) and/or another coordinate system may be used. The pixel in the upper left corner has a location of X=1, Y=1, the pixel to the right has a location of X=2, Y=1, and so forth. Further, as disclosed above, each pixel has an assigned distance value, which correspondence to the distance between the depth sensor 128 and a surface depicted in the corresponding pixel.

In FIG. 2, pixels having smaller (closer) distance values are shaded darker, and pixels having larger (farther) distance values are shaded lighter. Assuming, for example, the depth map represents an image of 1000×500 pixels, the depth map contains 500,000 pixels, each with an assigned distance value. In some examples, each pixel is a 16 bit data string or vector (defining the location of the pixel (in a 2D coordinate system) and the associated distance value). Thus, the depth map contains a relatively large amount of data. The collision avoidance system 126 analyzes the pixels 202 in the depth map using one or more algorithms or mathematical computations to identify and track the location of one or more object(s) in the field of view. For example, if an object in the field of view is detected as being within a threshold distance (e.g., 1 m) from the UAV 100, the collision avoidance system 126 may prohibit the UAV 100 from flying in that direction. As mentioned above, in some examples, the depth sensor 128 generates depth maps at a frequency of 60 Hz. As such, a relatively large amount of data is supplied to the collision avoidance system 126. Such a large amount of data typically requires larger hardware (e.g., a larger, more robust processor) to keep up with the amount of data. Otherwise, the collision avoidance system 126 may overheat and/or fail.

To address the above drawbacks, the example UAV 100 of FIG. 1 employs an example depth map modifier 130 that reduces the amount of data (e.g., pixels) in depth maps while still retaining sufficient details in the depth maps for analysis by the collision avoidance system 126. In the illustrated example of FIG. 1, the depth map modifier 130 is implemented by the processor 100. The depth map modifier 130 receives depth maps from the depth sensor 128, reduces the amount of data in the depth maps and/or generated updated depth maps, and transmits the updated or modified depth maps to the collision avoidance system 126 for analysis. The depth map modifier 130 may implement one or more example downsizing techniques disclosed herein for reducing the amount of pixels associated with each depth map.

Figure 3:
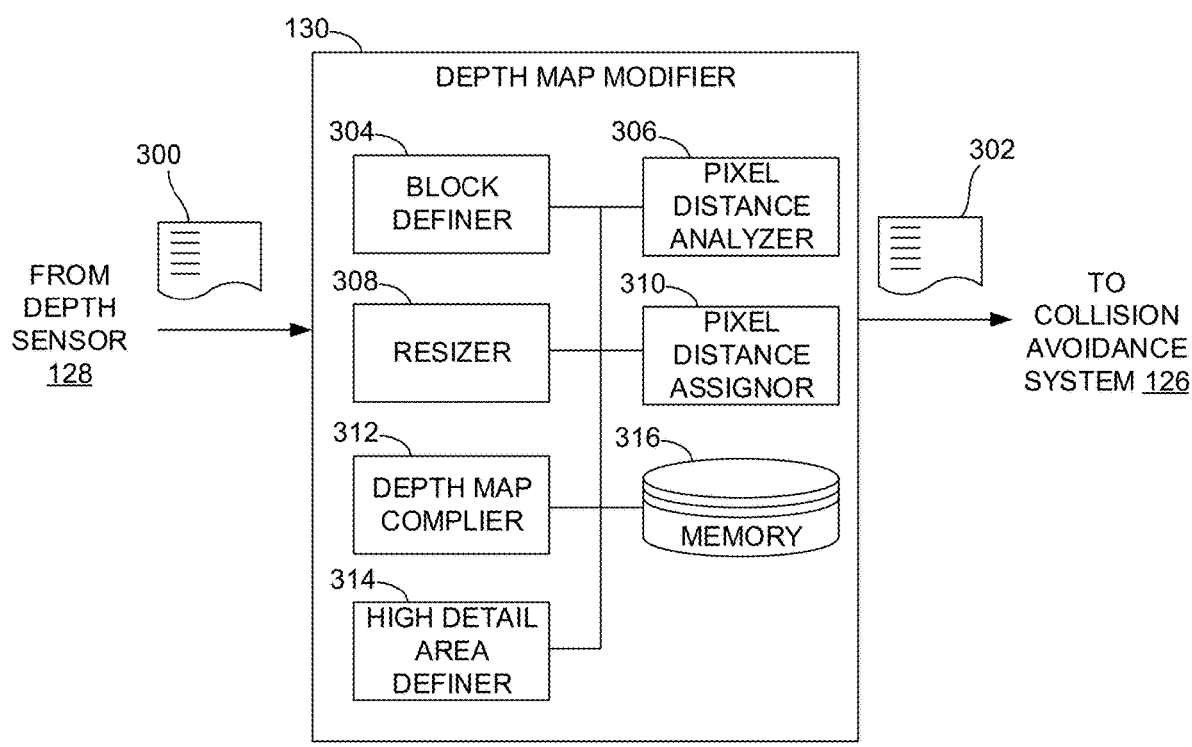
FIG. 3 is a block diagram of the example depth map modifier of FIG. 1 that may be used to reduce a size of a depth map for processing by an example collision avoidance system of the example UAV of FIG. 1.

FIG. 3 is a block diagram of the example depth map modifier 130 of FIG. 1. The example depth map modifier 130 receives a depth map 300 (e.g., a first depth map) from the depth sensor 128 and generates a new or updated depth map 302 (e.g., a second depth map) having fewer pixels than the depth map 300. The depth map 300 in FIG. 3 may correspond to the image representation 200 of FIG. 2, for example. For example, the depth map 300 may have a first plurality of pixels (e.g., 500,000 pixels), and the updated depth map 302 may have a second plurality of pixels (e.g., 20,000) smaller than the first plurality of pixels. The updated depth map 302 may be considered a modified version of the original depth map 300. Therefore, whenever describing generating the updated depth map 302, it is understood that the updated depth map 302 may be a modified version of the original depth map 300 (e.g., with less pixels and/or altered pixel information). For example, rather than generating the updated depth map 300, the original depth map 300 may be modified by removing certain pixels and/or altering the pixel information (e.g., a distance value associated with a pixel). The updated depth map 302 may then be analyzed by the collision avoidance system 126. As a result, each updated depth map has less data and, thus, the amount of computational power required by the collision avoidance system 126 to process the updated depth maps is reduced. As such, a smaller, more compact processor can be implemented on the UAV 100, which is advantageous to reduce overall weight, to reduce overall power consumption, etc. Furthermore, by reducing the amount of computational powered used by the processor 100 for the collision avoidance system 126, more processing power can be used for other components of the UAV 100, such as for visual simultaneous localizations and mapping (SLAM), object detection, video recording, etc. Reducing the computational load on the processor 100 can also reduce overheating of the processor 110.

In the illustrated example, the depth map modifier 130 includes an example block definer 304, an example pixel distance analyzer 306, an example resizer 308, an example pixel distance assignor 310, an example depth map complier 312, an example high detail area definer 314, and an example memory 316. In a first example technique, the depth map modifier 130 downsizes or down-samples the depth map 300 to a smaller resolution based on the smallest (closest) distance value within each block of pixels. For example, the block definer 304 applies a filter block to the depth map 300 that divides the pixels into a plurality of blocks. An example filter block size is 5×5 pixels. For example, referring back to FIG. 2, four blocks of pixels (each with 5×5 pixels) are depicted: a first block 204 in the upper left corner, a second block 206 in the upper right corner, a third block 208 in the lower left corner, and a fourth block 210 in the lower right corner. The pixel distance analyzer 306 reviews the distance values associated with each of the pixels 202 in the depth map 300 and identifies the pixel having the smallest (closest) distance value in each of the blocks 204-210. The resizer 308 downsizes or downsamples the depth map 300 based on the filter block size. For example, the first block 204 becomes one pixel (e.g., at a coordinate X=1, Y=1 in the updated depth map 302), the second block 206 becomes one pixel (e.g., at a coordinate X=2, Y=1 in the updated depth map 302), etc. If the original depth map 300 was 1,000×500 pixels, for example, the updated (downsized) depth map 302 is 200×100 pixels. Therefore, in some examples, the resizer 308 provides means for downsizing each block of pixels into a respective single pixel. The pixel distance assignor 310 assigns the smallest (closest) distance value of each of the blocks 204-210 to the new pixel in the updated depth map 302. For example, if pixel X=2, Y=2 has the smallest distance value of the pixels 202 in the first block 204, the new pixel represented by the first block 204 (e.g., at a coordinate X=1, Y=1 in the updated depth map 302) is assigned this distance value. This process is performed on each block, and each block is reduced to one pixel. The depth map compiler 312 generates the updated depth map 302 using the new pixels and the assigned distance values. Therefore, in the illustrated example, the depth map complier 312 provides means for generating a depth map (e.g., the updated depth map 302) based on the smallest distance values in the blocks of pixels. By downsizing the depth map 300 from 1,000×500 pixels to 200×100 pixels, for example, the amount of pixels is drastically reduced. Thus, when the updated depth map 302 is provided to the collision avoidance system 126, fewer calculations are used to analyze the depth maps and detect objects. While in the example describe above a filter block size of 5×5 pixels was used, in other examples, other size filter blocks may be used, such as 4×4 pixels, 6×6 pixels, 10×5 pixels, etc. The filter block may be square (e.g., 4×4 pixels) or rectangular (e.g., 4×6 pixels). The depth map 300, the updated depth map 302, and/or information associated with one or more of the pixels may be stored (permanently or temporarily) in the memory 314 during the example downsizing technique.

In some examples, the first downsizing technique may be implemented by retaining the same two-dimensional coordinate system from the depth map 300. For example, after the pixel distance analyzer 306 identifies the smallest distance values in each of the blocks 204-210, the pixel distance assignor 310 assigns the smallest distance value in each of the blocks 204-210 to the center pixel (or coordinate) in each of the blocks 204-210. For example, if pixel X=2, Y=2 has the smallest distance value of the pixels 202 in the first block 204, the pixel distance assignor 310 assigns this smallest distance value to the center pixel, which is pixel X=3, Y=3. The depth map complier 312 generates the updated depth map 302 by saving only the center pixels from each of the blocks 204-210 (e.g., X=3, Y=3; X=8, Y=3; X=3, Y=8; X=8, Y=X; etc.) and their assigned distance values, and discarding the other pixels in the blocks 204-210. As such, similar to the example disclosed above, the amount of pixels is reduced from 500,000 pixels to 20,000.

Figure 4:
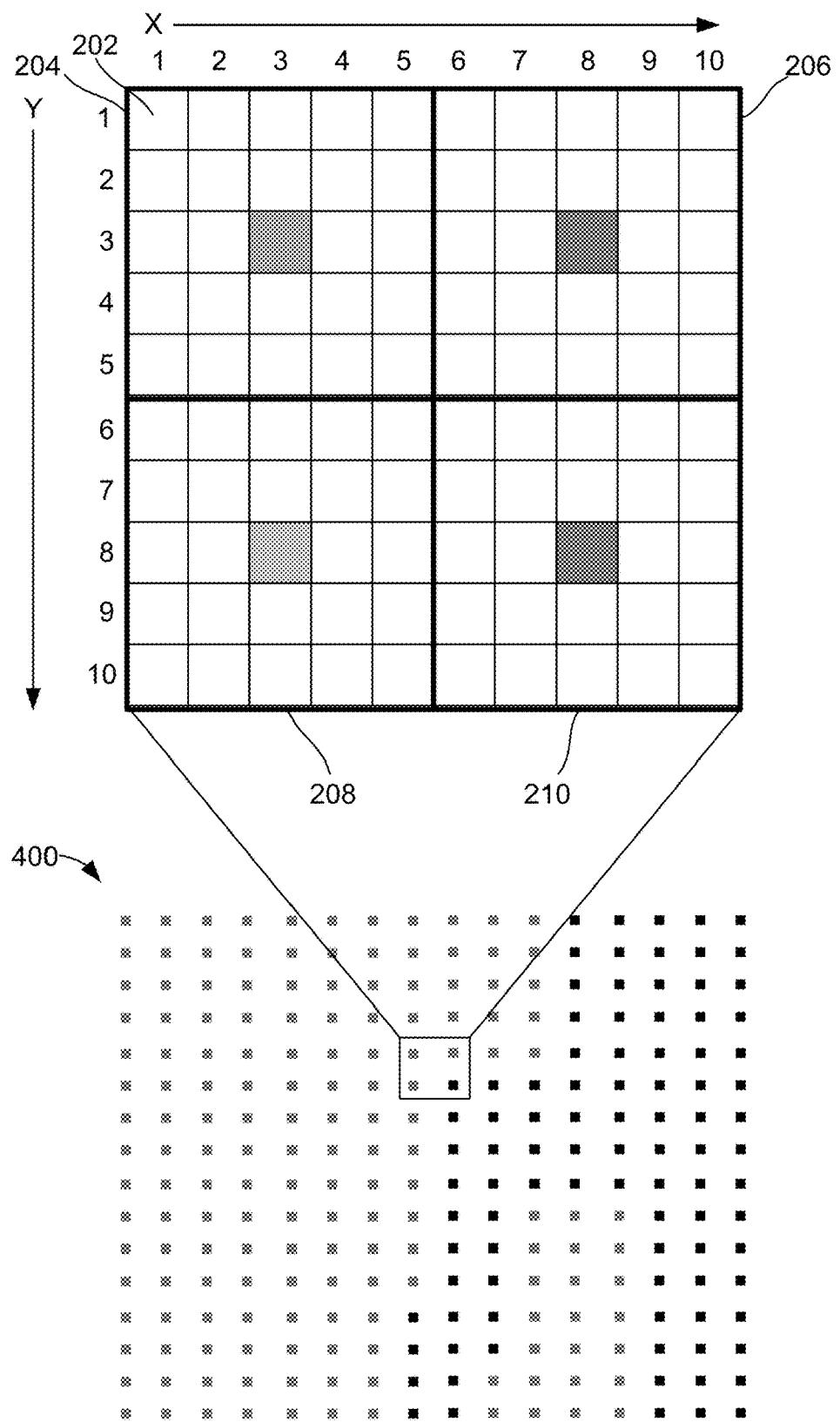
FIG. 4 illustrates an example 2D image representation of an example depth map modified using an first example downsizing technique implemented by the example depth map modifier of FIGS. 1 and 3.

FIG. 4 shows an example 2D image representation 400 of the updated depth map 302 as modified using this first example downsizing technique. The 2D image representation 400 may correspond to the same portion of the vehicle as circled in FIG. 2. As can been see in the callout in FIG. 4, the center pixels in each the blocks 204-210 are shaded, which represents the pixels that are saved or used in the updated depth map 302. The other pixels (non-shaded), are deleted and/or otherwise removed. As can be seen in the 2D image representation 400 of FIG. 4, the pixels that are saved still provide a relatively accurate representation of objects in the field of view while drastically reducing the amount of pixels.

Figure 5:
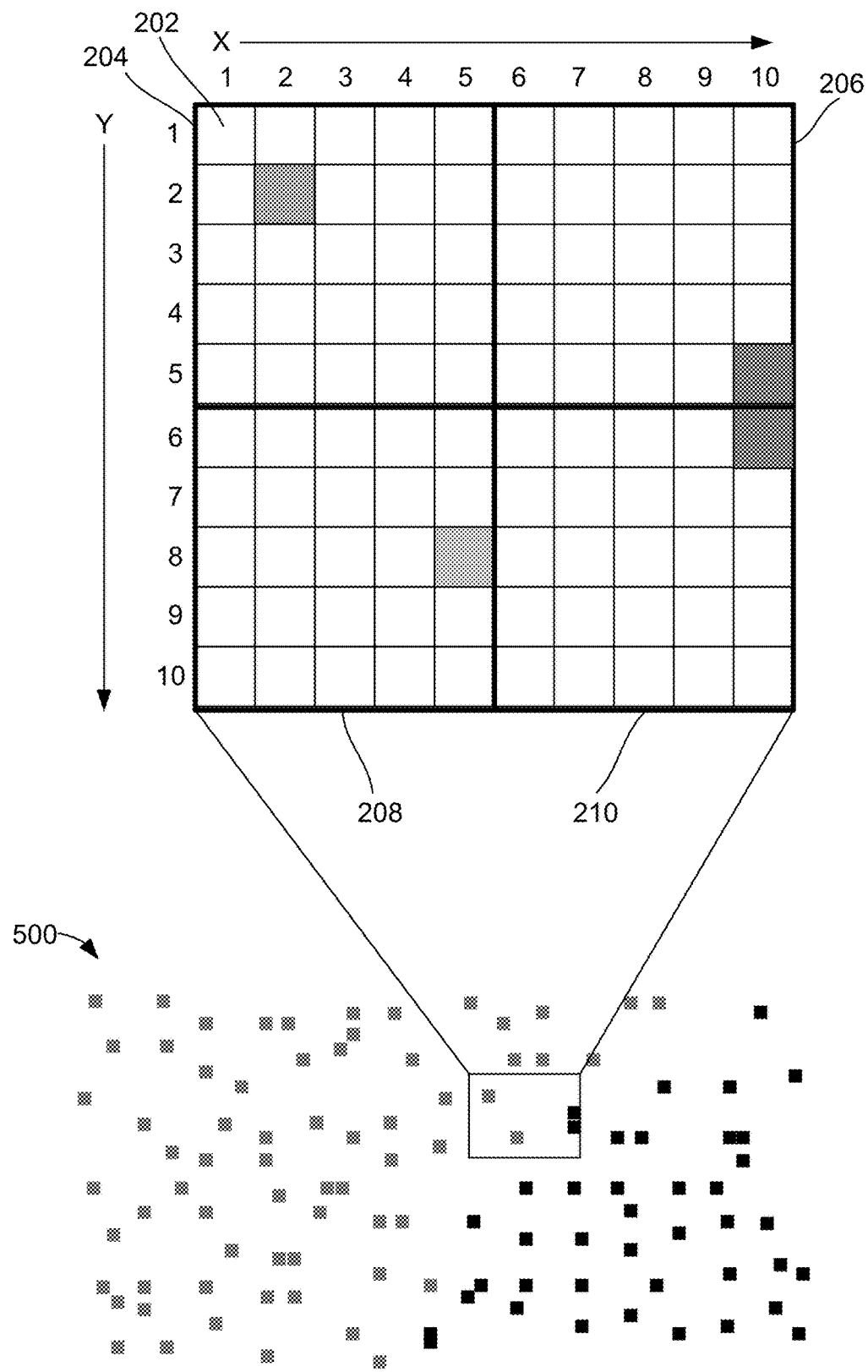
FIG. 5 illustrates an example 2D image representation of an example depth map modified using a second example downsizing technique implemented by the example depth map modifier of FIGS. 1 and 3.

In some examples, it may be desirable to retain the information regarding which of the pixels contributed to the closest distance value in each of the blocks. Therefore, in a second example downsizing technique, the depth map modifier 130 instead saves the pixels in each of the blocks 204-210 that contributed to the smallest (closest) distance values in the respective blocks 204-210. For example, FIG. 5, shows an example 2D image representation 500 of the updated depth map 300 as modified using the second example downsizing technique. The 2D image representation 500 may correspond to the same portion of the vehicle as circled in FIG. 2. In this example, the pixel distance analyzer 306 identifies the pixels 202 that have the smallest (closest) distance values in each of the blocks 204-210. In FIG. 5, the pixels having the smallest distance values in the blocks 204-210 are shaded (as shown in the callout). The depth map complier 312 creates the updated map 302 by saving the pixels having the smallest distance values in each of the blocks 204-210 (e.g., X=2, Y=2; X=10, Y=5, etc.) and discards the other pixels (non-shaded) in the blocks 204-210. Again, this reduces the amount of pixel information in the depth map from 500,000 to 20,000.

However, as can be seen in FIG. 5, sometimes this results in relatively large gaps between pixels in adjacent blocks. For example, with continuous surfaces, sometimes two neighboring pixels are the smallest distance values that are kept, which results in large gaps and insufficient data between these areas. Therefore, in a third example downsizing technique, some of the pixels corresponding to the smallest distance values are saved whereas other ones are assigned to the center pixels within a block. This enables high detail in areas where surface depths are changing and lower detail in areas where surfaces are more continuators or flat. For example, for each block of pixels it the original depth map 300, the pixel distance analyzer 306 determines a difference between the smallest and largest distance values in the respective block and compares the difference to a threshold distance. A small difference indicates that a surface corresponding to the block is relatively constant, whereas a large difference is indicative of a change in depth (such as at an edge or corner of two surfaces). If the difference for a block satisfies the threshold distance (e.g., is less than the threshold distance), then the pixel distance assignor 310 assigns the smallest distance value to the center pixel in the respective block. For this block, the depth map complier 312 saves the center pixel with the assigned distance value and discards the other pixels in the block, similar to the first example downsizing technique disclosed above. In other examples, instead of assigning the smallest distance value to the center pixel, the depth map complier 312 may save the original center pixel with the original depth value. If the difference does not satisfy the threshold distance (e.g., is above the threshold distance), there exists a relatively large change in depth in the block. As such, it may be valuable to retain the location of the smallest (closest) distance value. Therefore, the depth map complier 312 saves the pixel with the closest distance value in the block and discards the other pixels in the block. This example technique is applied to each block of pixels.

Figure 6:
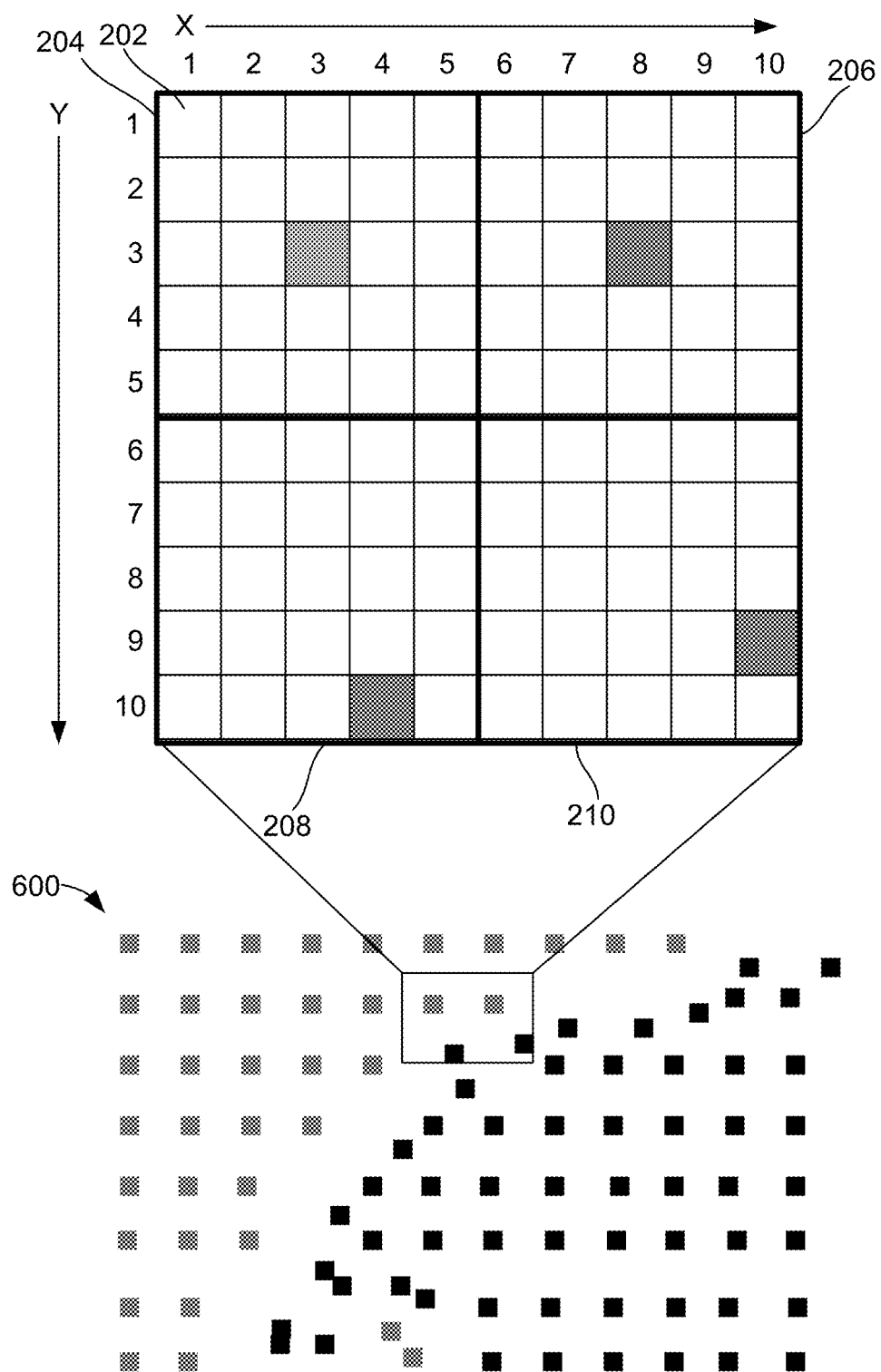
FIG. 6 illustrates an example 2D image representation of an example depth map modified using a third example downsizing technique implemented by the example depth map modifier of FIGS. 1 and 3.

FIG. 6 shows an example 2D image representation 600 of the updated depth map 302 as modified by the third example downsizing technique. The 2D image representation 600 may correspond to the same portion of the vehicle as circled in FIG. 2. For example, assume the difference between the smallest distance value and the largest distance value in the first block 204 satisfies the threshold distance (e.g., is below the threshold distance). In such an example, the pixel distance assignor 308 assigns the smallest distance to the center pixel X=3, Y=3 of the first block 204. When generating the updated depth map 302, the depth map complier 312 saves the center pixel of the first block 204 with the assigned distance value, and the other pixels in the first block 204 are deleted or removed. Looking at the third block 208, for example, assume the difference between the smallest distance value and the largest distance value in the third block 208 does not satisfy the threshold distance (e.g., is above the threshold distance). As such, a relatively large change in depth is represented in the third block 208. In such an example, the depth map complier 312 saves the pixel X=4, Y=10 having the smallest distance value in the third block 208 and discards or deletes the other pixels in the third block 208. Again, this reduces the amount of pixels in the depth map 300 from 500,000 to 20,000. In other words, with surfaces that are substantially constant or continuous (have small changes in distance), the pixel information can be assumed to be a center of the block without losing accuracy. On the other hand, for surfaces representing edges or areas where the depth changes, the location of the pixels associated with those smallest (closest) distance values are retained and, thus, accuracy in these areas can be retained (where the location of the smallest (closest) distance is important).

While in the example downsizing techniques disclosed above one pixel from each block is saved and/or used to generate the updated depth map 302, in other examples, more than one pixel from each block may be saved and/or used to generate the updated depth map 302. For example, when using the second downsizing technique, the two pixels having the two smallest distance values may be saved and/or used to generate the updated depth map 302. In another example, the pixel with the smallest distance value and the pixel with the largest distance value may be saved from each block. In still other examples, more than two pixels from each block may be saved, or different numbers of pixels may be saved from different blocks (e.g., two pixels from a first block are saved, three pixels from a second block are saved, etc.).

Figure 7:
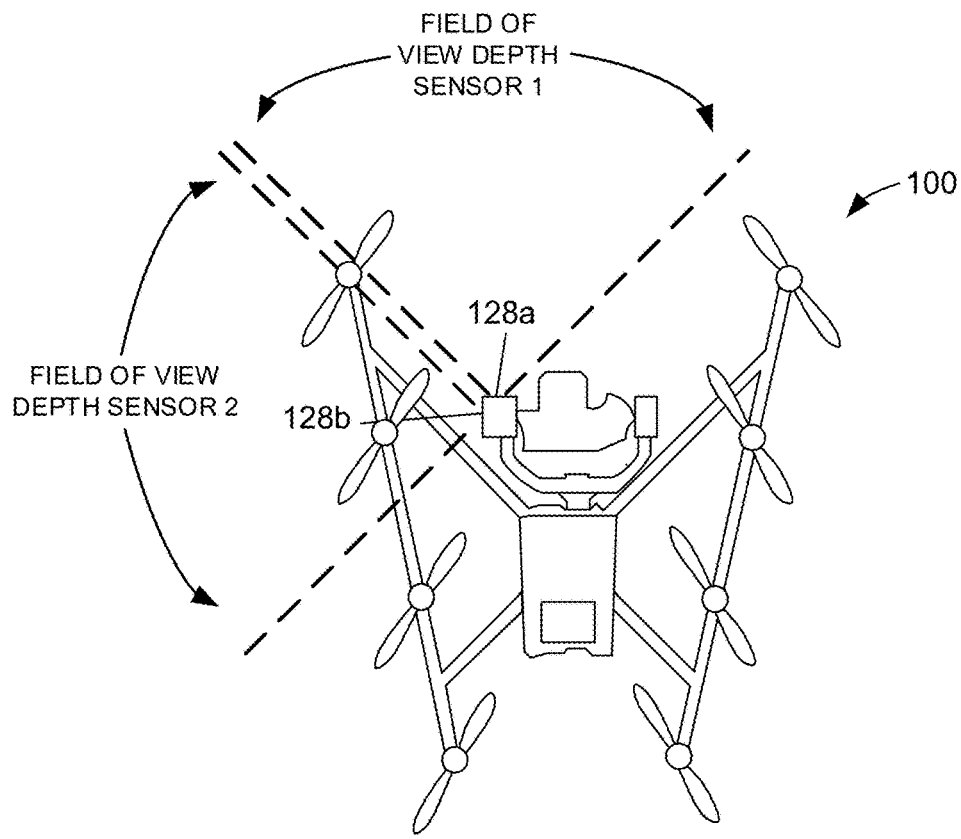
FIG. 7 is a top view of the example UAV of FIG. 1 having two example depth sensors.

In some examples, the UAV 100 may include two or more depth sensors and the depth map modifier 130 may similarly perform one or more of the example downsizing techniques (disclosed above) on the depth maps generated by multiple depth sensors. For example, FIG. 7 is a top view of the example UAV 100. In the illustrated example, the UAV 100 includes two example depth sensors: a first depth sensor 128a facing forward; and a second depth sensor 128b facing to the left. In this example, the first depth sensor 128a has a field of view of about 90° (or a 45° radius) facing forward, and the second depth sensor 128b has a field of view of about 90° facing to the left. In some examples, the fields of view may overlap. In other examples, the fields of view may align with each other or a gap may exist between the two. The first and second depth sensors 128a, 128b generate depth maps of their respective fields of the view. The depth map modifier 128 receives the depth maps and applies one or more of the example techniques disclosed above to reduce the data size of the depth maps, which reduces the computational loads on the collision avoidance system 126.

Figure 8:
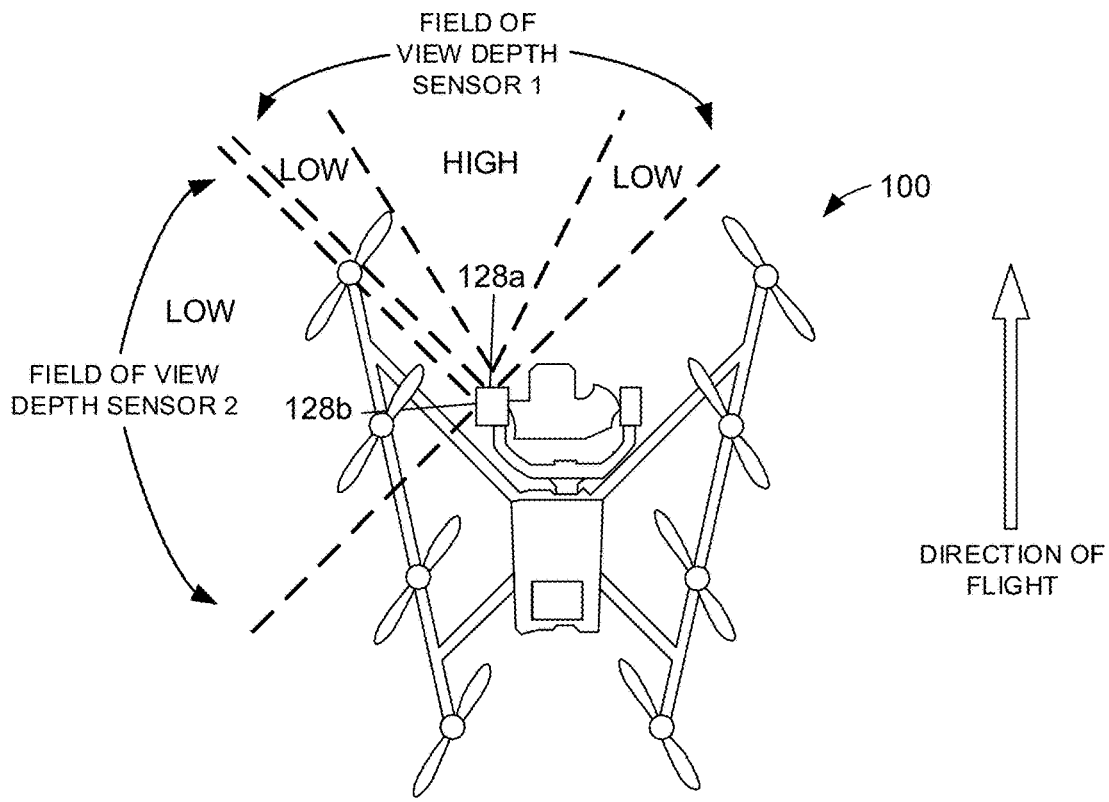
FIG. 8 illustrates an example high/low detail area scheme that may be used to modify a depth map using an example foveated filter technique implemented by the example depth map modifier when the example UAV 100 is traveling in a forward direction.

In some examples, to help further reduce the computational load on the collision avoidance system 126, the example depth map modifier 130 may apply a foveated depth filter technique based on the orientation and current direction of travel of the UAV 100. For example, as illustrated in FIG. 8, the UAV 100 is flying in a forward direction (relative to the orientation of the UAV 100). In such an example, it may be more valuable or relevant to detect obstacle(s) in front of the UAV 100, which are potentially in the flight path, than obstacles to the left view of the UAV 100, which are not in the flight path. Referring back to FIG. 3, the example depth map modifier 130 includes the high detail area definer 314. The high detail area definer 314 defines an area in which higher resolution is to be retained based on the orientation of the UAV 100 and/or the direction of travel. For example, in FIG. 8, a high detail area is shown in the direction of travel, which is forward in the example of FIG. 8. In the illustrated example, the high detail area (labeled HIGH) falls inside of the field of view of the first depth sensor 128a. The high detail area may be defined by a virtual cone or camera opening having a radius, such as 30° (or 60° total field of view), extending from the UAV 100 in the direction of travel. Areas outside of the high detail area (e.g., areas in the periphery) are considered low detail areas (labeled LOW). As shown in FIG. 8, the middle portion of the field of view of the first depth sensor 128a includes the high detail area, and the areas outside this middle portion (to the left and the right) are low detail areas. Furthermore, the entire field of view of the second depth sensor 128b is considered a low detail area.

To further downsize or reduce the amount of data in the depth maps, in some examples, the block definer 304 applies a first size filter block to the pixels that fall within the high detail area and applies a second size filter block to the pixels that are outside of the high detail area (i.e., within the low detail areas). For example, for pixels within the high detail area of the depth map from the first depth sensor 128a, the block definer 304 may apply a filter block of 5×5 pixels. However, for pixels within the low detail area(s) of the depth map from the first depth sensor 128a and the entire depth map from the second depth sensor 128b, the block definer 304 applies a larger size filter block, such as 10×10 pixels. Then, one or more of the examples downsizing techniques disclosed herein (e.g., the first downsizing technique disclosed in connection with FIGS. 2 and 4, the second downsizing technique disclosed in connection with FIG. 5, the third downsizing technique disclosed in connection with FIG. 6, etc.) may be applied to reduce each of the blocks of pixels to one pixel. As a result, more pixels are retained the high detail area(s), where detection of obstacles is more crucial (e.g., because they are in the flight path), and fewer pixels are retained in the lower detail area(s) where obstacles are not as important, thereby further reducing the computational power needed to analyze the depth maps.

Figure 9:
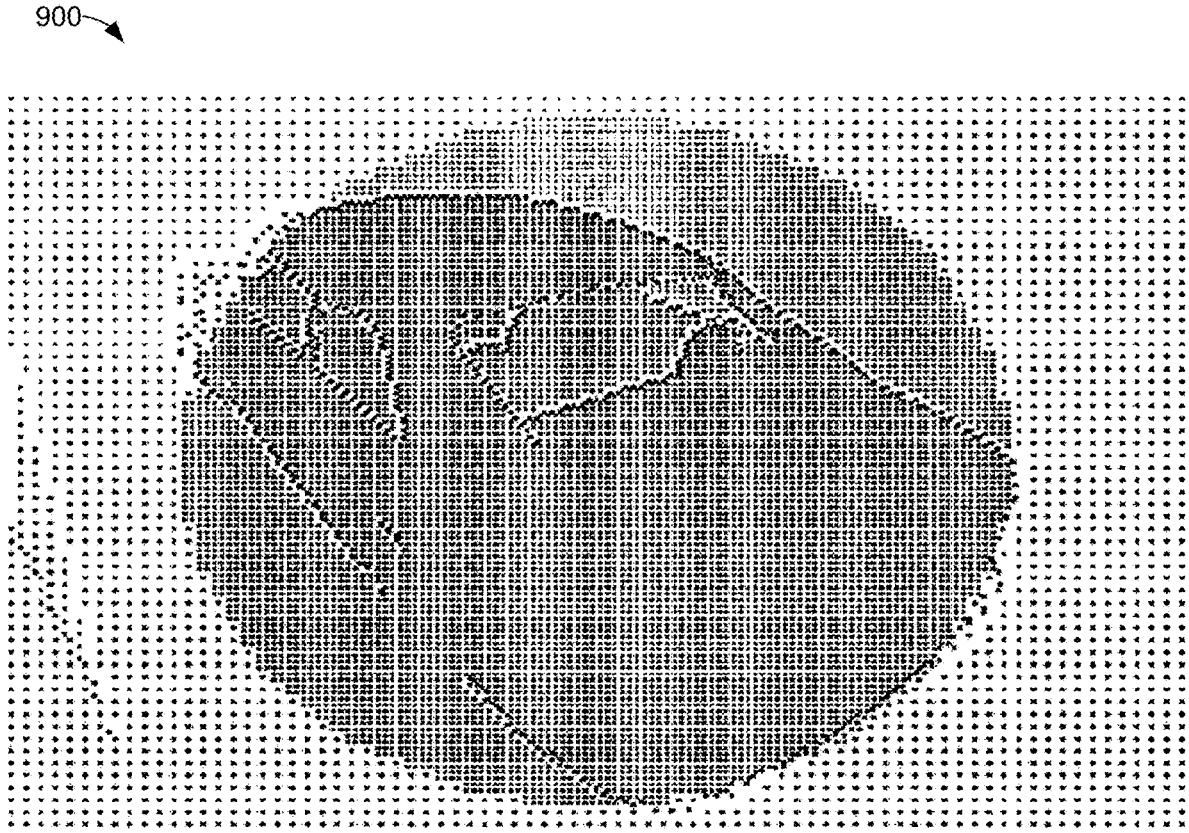
FIG. 9 illustrates an example 2D image representation of an example depth map modified based on the example high/low detail area scheme illustrated in FIG. 8.

FIG. 9 shows an example 2D image representation 900 of a depth map modified using the example foveated depth filter technique. The circular area in the center of the 2D image representations 900 corresponds to the high detail area, and the surrounding area corresponds to the low detail area. A smaller filter block is applied to the pixels in the high detail area and a larger filter block is applied to the pixels in the low detail area. As such, more pixels are retained in the high detail area, whereas fewer pixels are retained in the low detail area. Depending on the orientation and the direction of travel of the UAV 100, the direction of the high detail area changes. For example, if the UAV 100 was traveling to the left, the high detail area would be pointing to the left and the high and low details areas would be switched relative to FIG. 8. In such an example, the entire depth map produced by the first depth sensor 218a would be filtered using a larger size filter block, whereas the middle of the depth map produced by the second depth sensor 218*b* would be filtered using a smaller size filter block and the area(s) outside of the middle would be filtered using the larger size filter block.

Figure 10:
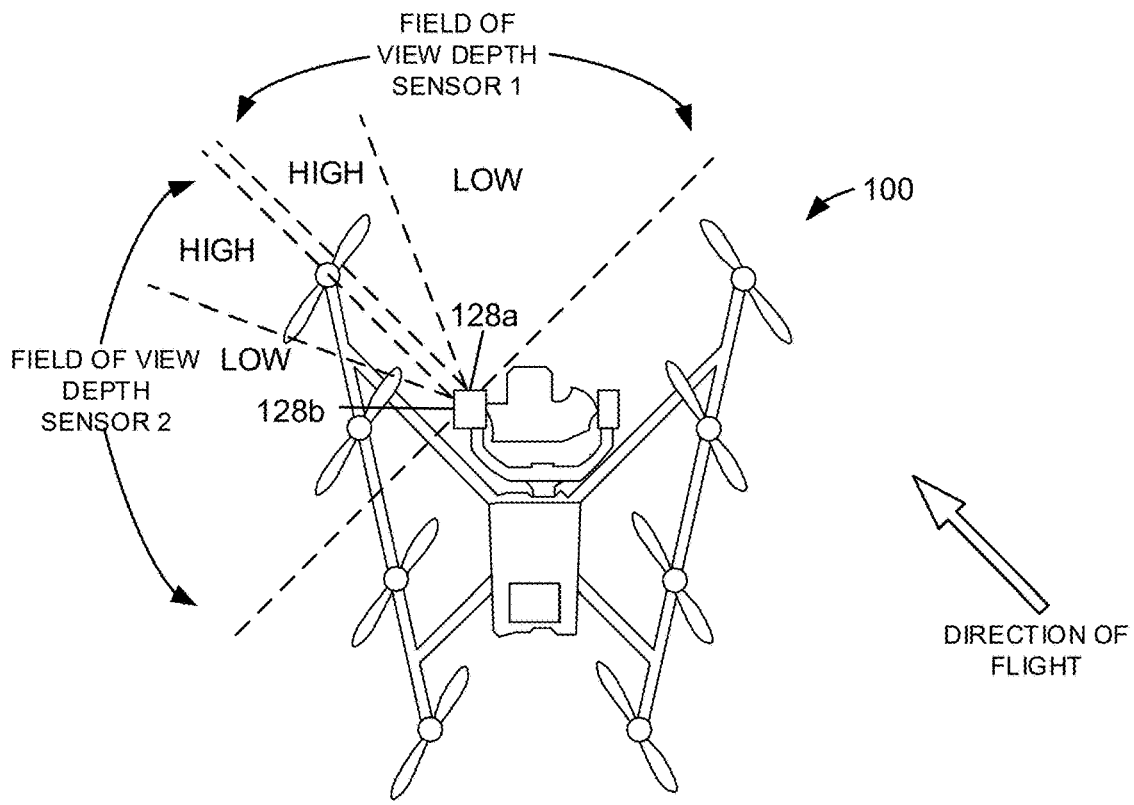
FIG. 10 illustrates another example high/low detail area scheme that may be used when the example UAV is traveling in a forward-left direction.

FIG. 10 shows an example in which the UAV 100 is traveling forward and to the left. In such an example, the high detail area includes a portion of both the fields of view. Therefore, the left side of the depth maps produced by the first depth sensor 128*a* would be in the high detail area and would be processed with a smaller filter block, and the right side of the depth maps produced by the second depth sensor 128*b* would likewise be in the high detail area and processed with a smaller filter block. The pixels falling within the low detail areas of the depth maps may be analyzed using a larger size filter block.

Figure 11:
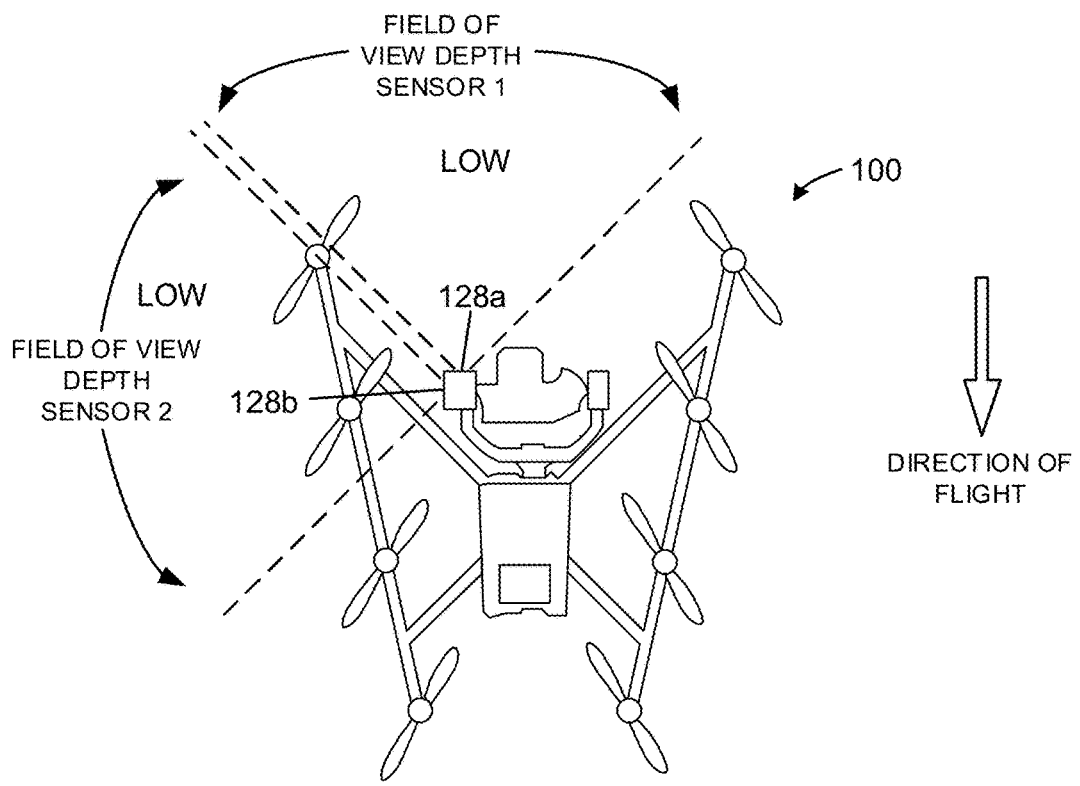
FIG. 11 illustrates another example high/low detail area scheme that may be used when the example UAV is traveling in a reverse direction.

FIG. 11 shows an example in which neither field of view includes the high detail area. For example, in FIG. 11, the UAV 100 is flying backwards or in the reverse direction. In this example, the high detail area would be in the backwards or reverse direction. However, because neither of the depth sensors 128*a*, 128*b* are facing the rear direction, both field of views are considered low detail areas. As such, when downsizing the depth maps, the depth map modifier 130 may apply the larger size filter block (e.g., 10×10) to the pixels in the depth maps.

In other examples, the UAV 100 may include more depth sensors and/or the depth sensors may be oriented in different directions. In some examples, the UAV 100 may include six (6) cameras, one facing in each direction, such as forward, backward, left, right, up, and down. In such an example, the depth sensors could provide a complete 360° view of all sides of the UAV 100, including above and below. In such an example, one or a few of the depth sensors would include the high detail area, whereas the remaining depth sensors would include low detail areas that can be drastically reduced to decrease computational loads on the collision avoidance system. Also, while in the example above the pixels were divided into high and low detail areas, in other examples, the pixels may be divided into more than two types of areas, and different size filter blocks may be used for each area (e.g., using a first size filter block on a high detail area, using a second size filter block (larger than the first size filter block) on an intermediate or medium detail area, and using a third size filter block (larger than the second size filter block) on a low detail area).

In some examples, the depth map modifier 130 may change the filter block size based on a future flight path. For example, referring back to FIG. 8, if the flight trajectory includes a plan to eventually fly to the left, then, rather than applying a larger filter block to the depth map of the second depth sensor 128*b*, the block definer 304 may use a smaller filter block to retain the detail to the left of the UAV 100 to track potential obstacles that may become problems in the near future.

While in the illustrated example of FIG. 1 the collision avoidance system 126 and the depth map modifier 130 are implemented by the processor 110 carried by the UAV 100, in other examples, the collision avoidance system 126 and/or the depth map modifier 130 may be remote to the UAV 100. For example, the UAV 100 may be part of an unmanned aerial system that communicates with a ground controller. In some such examples, the collision avoidance system 126 and/or the depth map modifier 130 may be implemented in the ground controller. For example, as the depth sensor 128 produces depth maps, the UAV 100 of such examples can transmit (e.g., via the wireless transceiver 122) the depth maps to the ground controller. The depth map modifier 130, implemented in the ground controller, may implement one or more of the example techniques disclosed herein to reduce the size of the depth maps. The ground controller may then transmit the updated depth maps back to the UAV 100, wherein the collision avoidance system 126 analyzes the depth maps. In other examples, the collision avoidance system 126 may also be remote and analyze the depth maps remotely. If a potential collision is detected, the collision avoidance system 126 may transmit commands (e.g., instructions) back to the UAV 100 to take an appropriate course of action (e.g., change trajectory, change velocity, etc.).

While an example manner of implementing the depth map modifier 130 of FIG. 1 is illustrated in FIG. 3, one or more of the elements, processes and/or devices illustrated in FIGS. 1 and 3 may be combined, divided, re-arranged, omitted, eliminated and/or implemented in any other way. Further, the example motor controller(s) 108, the example flight control system 120, the example collision avoidance system 126, the example depth map modifier 130, including the example block definer 304, the example pixel distance analyzer 306, the example resizer 308, the example pixel distance assignor 310, the example depth map complier 312, and/or the example high detail area definer 314, and/or, more generally, the example processor 110 of FIG. 1 may be implemented by hardware, software, firmware and/or any combination of hardware, software and/or firmware. Thus, for example, any of the example motor controller(s) 108, the example flight control system 120, the example collision avoidance system 126, the example depth map modifier 130, including the example block definer 304, the example pixel distance analyzer 306, the example resizer 308, the example pixel distance assignor 310, the example depth map complier 312, and/or the example high detail area definer 314, and/or, more generally, the example processor 110 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example motor controller(s) 108, the example flight control system 120, the example collision avoidance system 126, the example depth map modifier 130, including the example block definer 304, the example pixel distance analyzer 306, the example resizer 308, the example pixel distance assignor 310, the example depth map complier 312, and/or the example high detail area definer 314, and/or, more generally, the example processor 110 is/are hereby expressly defined to include a non-transitory computer readable storage device or storage disk such as a memory, a digital versatile disk (DVD), a compact disk (CD), a Blu-ray disk, etc. including the software and/or firmware. Further still, the example processor 110 and/or the example depth map modifier of FIGS. 1 and 3 may include one or more elements, processes and/or devices in addition to, or instead of, those illustrated in FIGS. 1 and 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic or machine readable instructions for implementing the processor 110 and/or the depth map modifier of FIGS. 1 and 3 are shown in FIGS. 12-16. The machine readable instructions may be a program or portion of a program for execution by a processor such as the processor 1712 shown in the example processor platform 1700 discussed below in connection with FIG. 17. The program may be embodied in software stored on a non-transitory computer readable storage medium such as a CD-ROM, a floppy disk, a hard drive, a DVD, a Blu-ray disk, or a memory associated with the processor 1712, but the entire program and/or parts thereof could alternatively be executed by a device other than the processor 1712 and/or embodied in firmware or dedicated hardware. Further, although the example program is described with reference to the flowcharts illustrated in FIGS. 12-16, many other methods of implementing the example processor 110 and/or the example depth map modifier 130 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 12-16 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, and (6) B with C.

Figure 12:
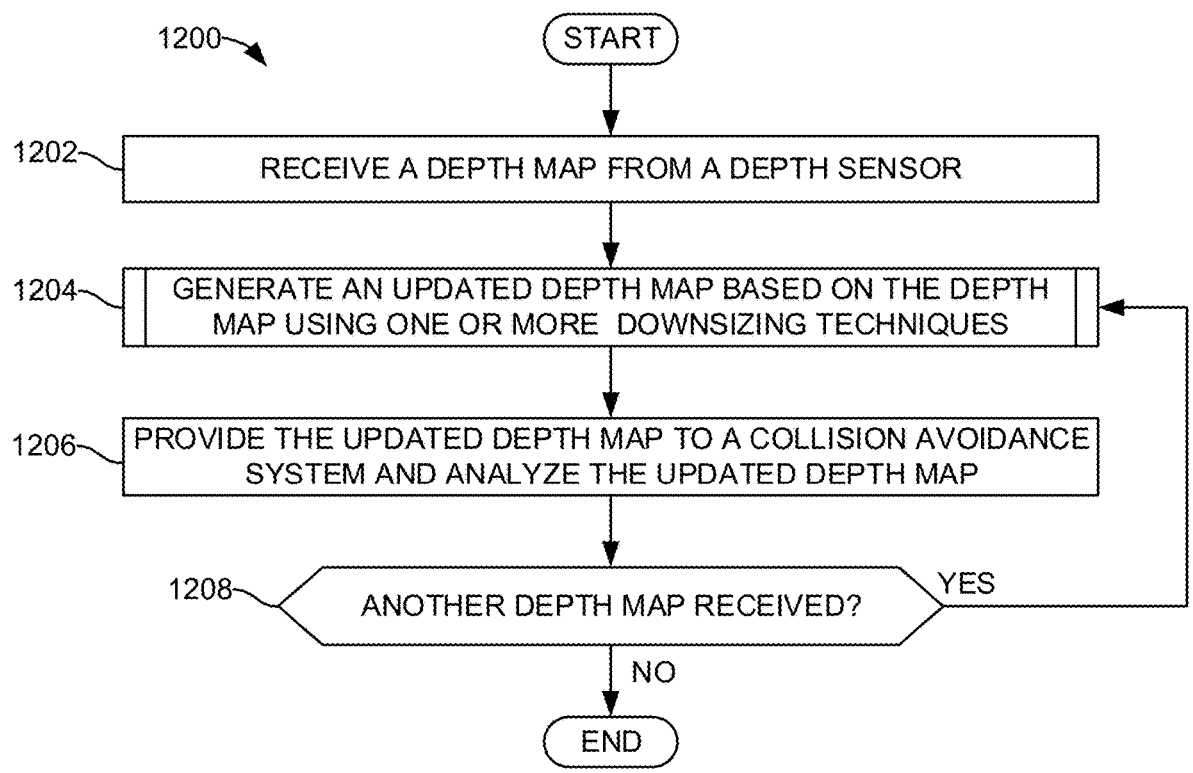
FIG. 12 is a flowchart representative of example machine readable instructions that may be executed to implement the example depth map modifier of FIGS. 1 and 3 to reduce a depth map size.

FIG. 12 is a flowchart 1200 representative of example machine readable instructions that may be executed by the processor 110 of the UAV 100 to implement the example depth map modifier of FIGS. 1 and 3 to reduce a size of a depth map. At block 1202, the example depth map modifier 130 receives the depth map 300 (e.g., a first depth map) from the depth sensor 128. At block 1204, the depth map modifier 130 generates the updated depth map 302 (e.g., a second depth map) based on the depth map 300 using one or more of the example downsizing techniques disclosed herein. Example flowcharts representing example downsizing techniques that may be implemented as block 1204 are disclosed in connection with FIGS. 13-15 described below. The updated depth map 302 is a modified version of the depth map 300 and includes fewer pixels than the depth map 300.

At block 1206, the depth map modifier 130 provides the updated depth map 302 (which has less data than the originally generated depth map 300) to the collision avoidance system 126. The collision avoidance system 126 analyzes the updated depth map 300 to track the distance(s) of object(s) near the UAV 100. If a potential collision is detected, the collision avoidance system 126 may communicate with the flight control system 120 to at least one of change a trajectory or change a velocity of the UAV 100. In some examples, the UAV 100 may transmit an alert back to a remote controller to alert a user of the potential collision.

At block 1208, the depth map modifier 130 determines whether another depth map is received from the depth sensor 128. If so, the example process begins again. As mentioned above, in some examples, the depth sensor 128 generates depth maps at a relatively high frequency, such as 60 Hz. Each time a depth map is generated, the example depth map modifier 130 may reduce the size of the depth map using the example process of FIG. 12. If a depth map is not received (e.g., the UAV 100 is no longer flying), the example process of FIG. 12 ends.

Figure 13:
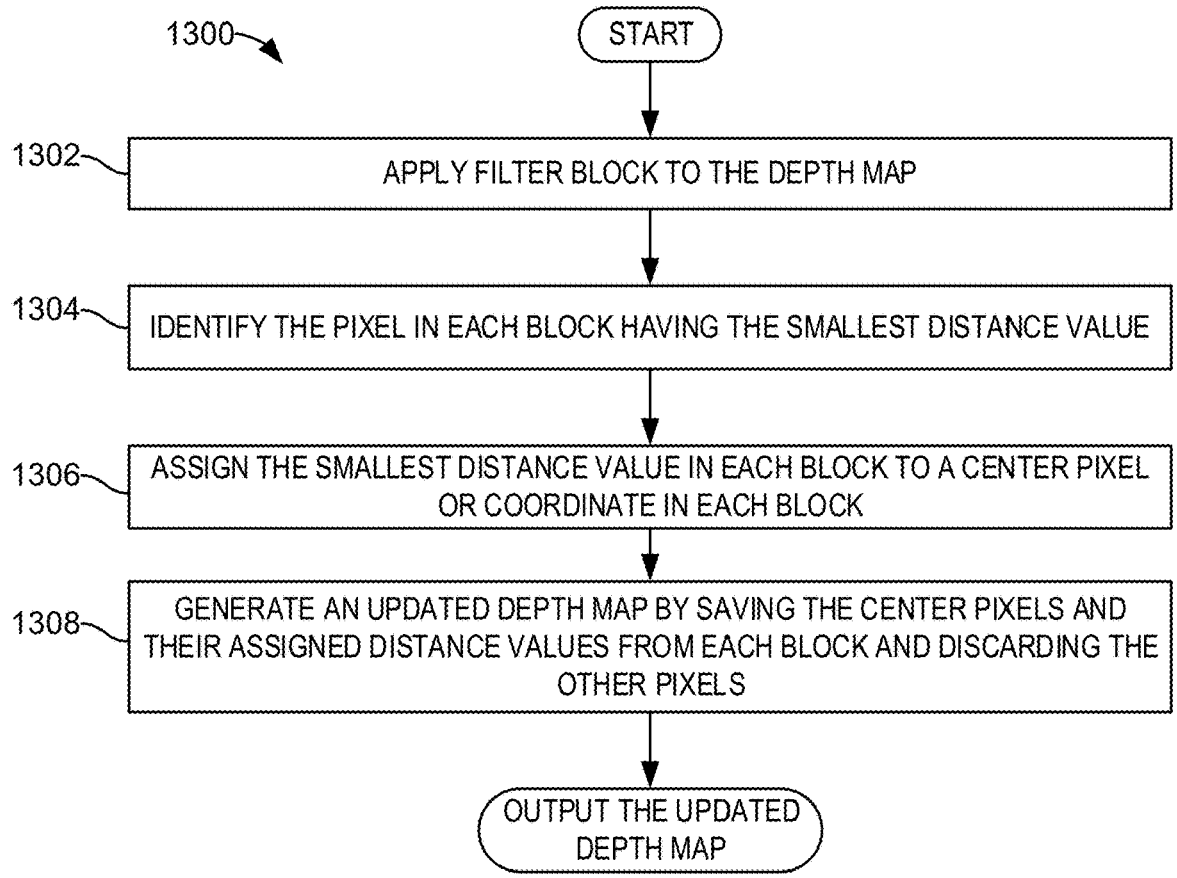
FIG. 13 is a flowchart representative of example machine readable instructions that may be executed to implement a first example downsizing technique and which may correspond to example instructions in the example flowchart of FIG. 12.

FIG. 13 is a flowchart 1300 representative of example machine readable instructions that may be executed by the processor 110 of the UAV 100 to implement block 1204 of FIG. 12. In particular, the flowchart 1300 represents an example process that may be employed to reduce a size of a depth map using the first example downsizing technique disclosed above in conjunction with FIG. 4.

At block 1302, the block definer 304 applies a filter block to the depth map 300, which divides the pixels into a plurality of blocks (e.g., the blocks 204-210 shown in FIGS. 2 and 4). For example, in FIG. 4, the filter block size is 5×5 pixels. In other examples, the filter block size may be larger or smaller.

At block 1304, the pixel distance analyzer 306 identifies the pixel in each block of pixels (e.g., in each of the blocks 204-210) with the smallest distance value (i.e., representing the closest surface to the UAV 100). At block 1306, the pixel distance assignor 310 assigns the smallest distance value identified in each block (at block 1304) to the center pixel or center coordinate in each block. Therefore, in some examples, the pixel distance assignor 310 provides means for assigning the smallest distance value identified in each block to the center pixel or center coordinate of the respective block.

At block 1308, the depth map complier 312 generates the updated depth map 302 by saving the center pixels and their assigned distance values from each block and discarding (e.g., deleting) the other pixels in each block. The updated depth map 302 is output to the collision avoidance system 126 in block 1206 of FIG. 12.

Figure 14:
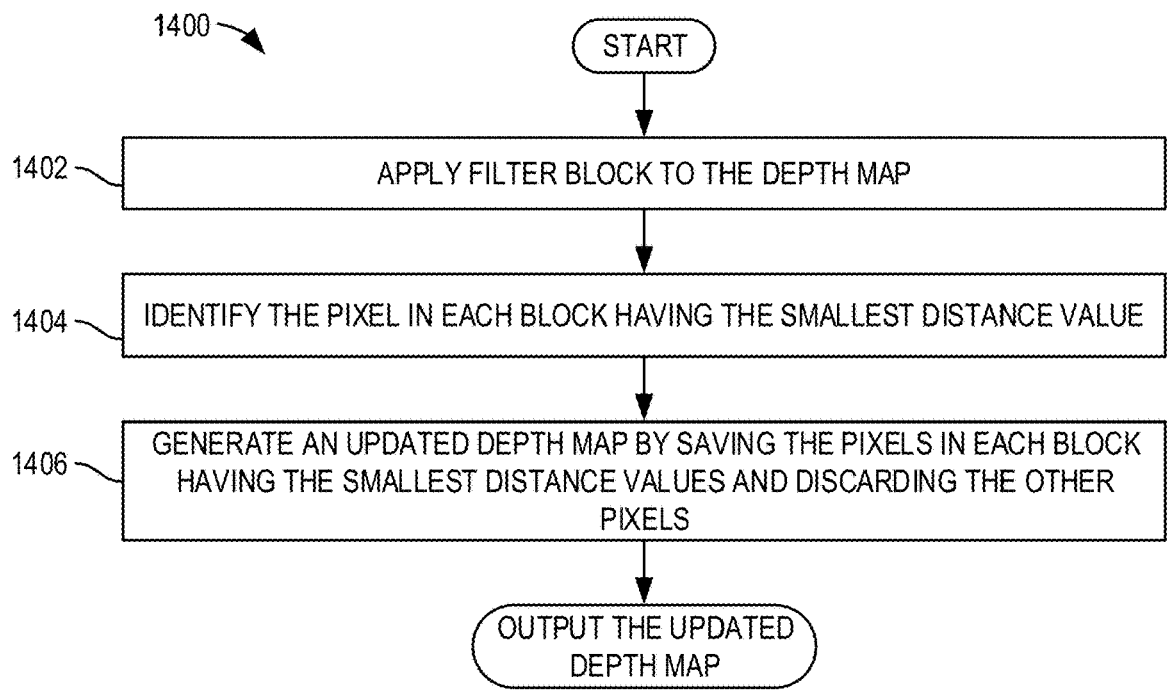
FIG. 14 is a flowchart representative of example machine readable instructions that may be executed to implement a second example downsizing technique and which may correspond to example instructions in the example flowchart of FIG. 12.

FIG. 14 is a flowchart 1400 representative of example machine readable instructions that may be executed by the processor 110 of the UAV 100 to implement block 1204 of FIG. 12. In particular, the flowchart 1400 represents an example process that may be employed to reduce a size of a depth map using the second example downsizing technique disclosed above in conjunction with FIG. 5.

At block 1402, the block definer 304 applies a filter block to the depth map 300, which divides the pixels into a plurality of blocks (e.g., the blocks 204-210 of FIG. 5). For example, in FIG. 5, the filter block size is 5×5 pixels. In other examples, the filter block size may be larger or smaller. Therefore, in some examples, the block definer 304 provides means for applying a filter block to a depth map.

At block 1404, the pixel distance analyzer 306 identifies the pixel in each block of pixels (e.g., in each of the blocks 204-210) with the smallest distance value (i.e., representing the closest surface to the UAV 100). Therefore, in some examples, the pixel distance analyzer 306 provides means for identifying the smallest distance values in the blocks of pixels. At block 1406, the depth map complier 312 generates the updated depth map 302 by saving the pixels in each block having the smallest distance values (identified at block 1404) and discarding the other pixels in each block. In other words, certain ones of the pixels (with their original locations and distance values) from the depth map 300 are used in the updated depth map 302, whereas other ones of the pixels are discarded. The updated depth map 302 is output to the collision avoidance system 126 in block 1206 of FIG. 12.

Figure 15:
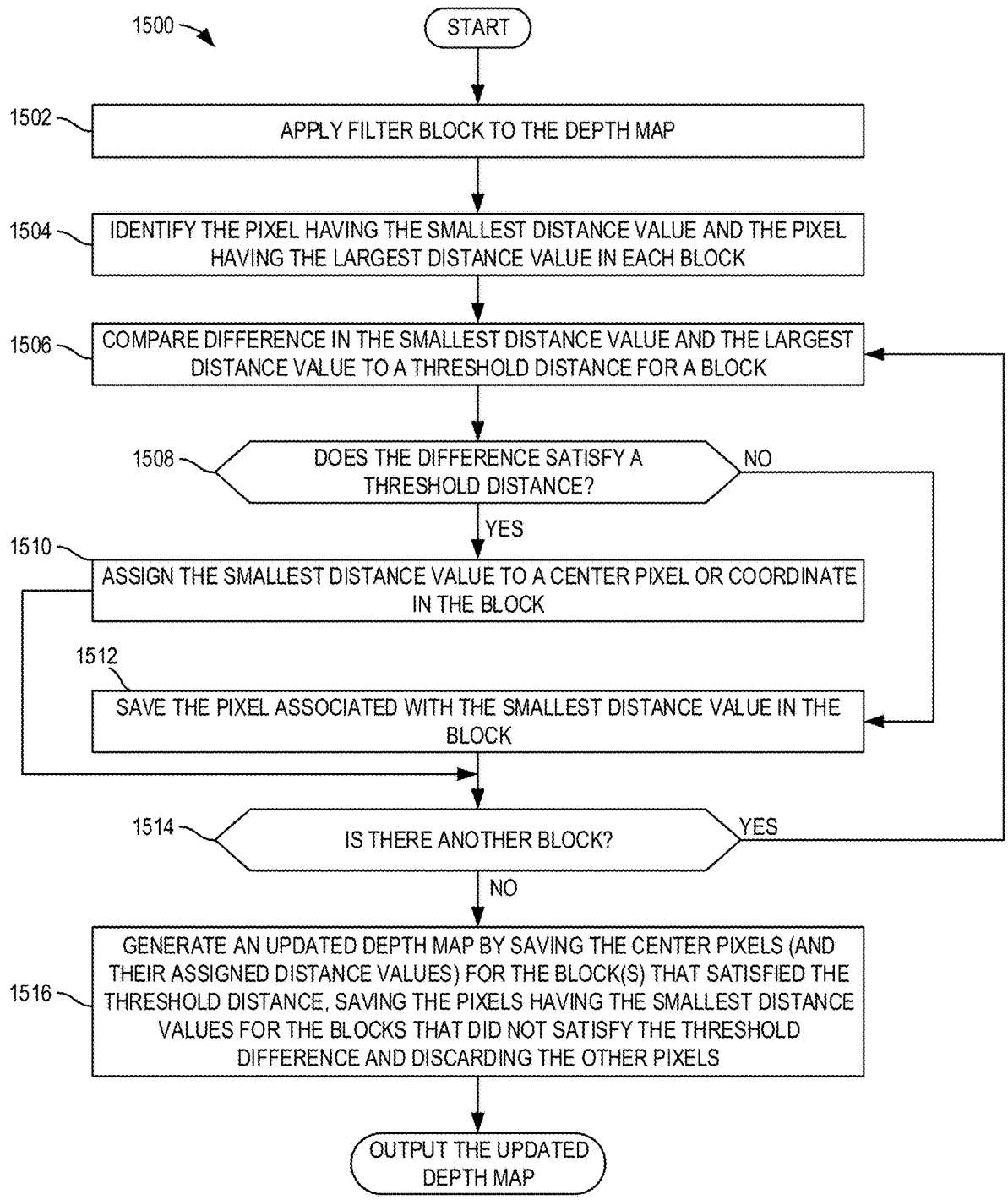
FIG. 15 is a flowchart representative of example machine readable instructions that may be executed to implement a third example downsizing technique and which may correspond to example instructions in the example flowchart of FIG. 12.

FIG. 15 is a flowchart 1500 representative of example machine readable instructions that may be executed by the processor 110 of the UAV 100 to implement block 1204 of FIG. 12. In particular, the flowchart 1500 represents an example process that may be employed to reduce a size of a depth map using the third example downsizing technique disclosed above in conjunction with FIG. 6.

At block 1502, the block definer 304 applies a filter block to the depth map 300, which divides the pixels into a plurality of blocks (e.g., the blocks 204-210 of FIG. 6). For example, in FIG. 6, the filter block size is 5×5 pixels. In other examples, the filter block size may be larger or smaller.

At block 1504, the pixel distance analyzer 306 identifies the pixel with the smallest distance value (i.e., representing the closest surface to the UAV 100) and the pixel with the largest distance value in each of the blocks (e.g., in each of the blocks 204-210). At block 1506, for a given block of pixels in the original depth map 300, the pixel distance analyzer 306 compares the difference in the smallest distance value and the largest distance value for the block to a threshold distance. At block 1508, the pixel distance analyzer 306 determines whether the difference satisfies a threshold distance. If the difference satisfies the threshold distance (e.g., is below the threshold distance), at block 1510, the pixel distance assignor 310 assigns the smallest distance value identified in the block to the center pixel (or center coordinate) in the block (e.g., similar to the operation disclosed in connection with FIG. 13). If the difference does not satisfy the threshold distance (e.g., exceeds the threshold distance), at block 1512, the pixel distance assignor 310 saves the pixel associated with the smallest distance value in the block, thereby retaining the location information. As such, the updated depth map 302 includes the original pixel (with is original location and distance value information), whereas other pixels are discarded.

At block 1514, the pixel distance analyzer 306 determines whether there is another block to be analyzed. If so, the process in blocks 1506-1512 is repeated. Once all the blocks are analyzed, at block 1516, the depth map complier 312 generates the updated depth map 302 by saving the center pixels and their assigned distance values for the block(s) that satisfied the threshold distance, saving the pixels having the smallest distance values for the block(s) that did not satisfy the threshold distance, and discarding the other pixels in the blocks. The updated depth map 302 is output to the collision avoidance system 126 in block 1206 of FIG. 12.

Figure 16:
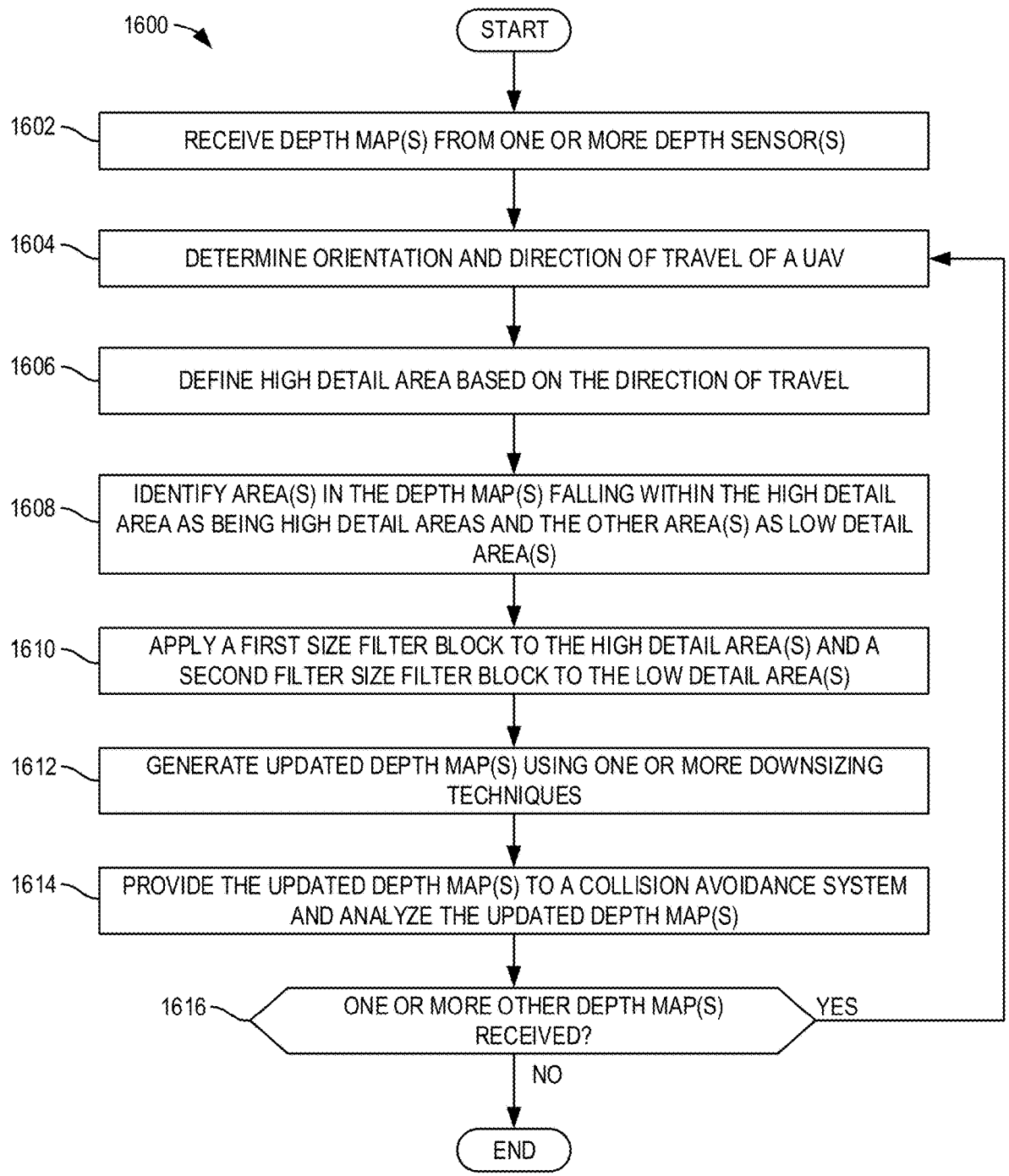
FIG. 16 is a flowchart representative of second example machine readable instructions that may be executed to implement the example depth map modifier of FIGS. 1 and 3 to reduce a depth map size using an example foveated filter technique.

FIG. 16 is a flowchart 1600 representative of example machine readable instructions that may be executed by the processor 110 of the UAV 100 to implement the example depth map modifier of FIGS. 1 and 3. In particular, FIG. 16 represents an example process of using the example foveated depth filter technique as described in conjunction with FIGS. 7-11.

At block 1602, the example depth map modifier 130 receives the depth map(s) from one or more depth sensor(s), such as the depth map sensors 128a, 128b. At block 1604, the high detail area definer 314 determines the orientation and current direction of travel of the UAV 100. In some examples, the high detail area definer 314 determines the orientation and direction of travel based on input from the sensor system 114 and/or the flight control system 120. Therefore, in some examples, the high detail area definer 314 provides means for determining a direction of travel of the UAV 100. At block 1606, the high detail area definer 314 defines the high detail area based on the orientation and direction of travel. In particular, the high detail area is oriented in the direction of travel (based on the UAV reference frame). The high detail area may be represented by a virtual cone extending from the UAV 100 in the direction of travel, for example.

At block 1608, the high detail area definer 314 identifies or determines the area(s) in the depth map(s) falling within the high detail area as being high detail area(s) and the other area(s) (falling outside the high detail area) as being low detail area(s). Therefore, in some examples, the high detail area definer 314 provides means for identifying the high detail area(s) and/or the low detail area(s) within pixels of a depth map. At block 1610, the block definer 304 applies a first size filter block, such as a 5×5 filter block, to the high detail area(s) and applies a second size filter block, such as 10×10 filter block, to the low detail area(s). At block 1612, the depth map complier 312 generates one or more updated depth maps using one or more of the example downsizing techniques disclosed herein (e.g., as disclosed in connection with FIGS. 13-15). As a result, less information is saved in the areas that are of lower detail.

At block 1614, the depth map modifier 130 provides the updated depth map(s) to the collision avoidance system 126. The collision avoidance system 126 analyzes the updated depth map(s) to track the distance(s) of object(s) near the UAV 100. If a potential collision is detected, the collision avoidance system 126 may communicate with the flight control system 120 to at least one of change a trajectory or change a velocity of the UAV 100. In some examples, the UAV 100 may transmit an alert back to a remote controller to alert a user of the potential collision.

At block 1616, the depth map modifier 130 determines whether one or more other depth map(s) is/are received from the depth sensor(s). If so, the example process begins again. As mentioned above, in some examples, the depth sensors generate depth maps at a relatively high frequency, such as 60 Hz. Each time depth maps are generated, the example depth map modifier may reduce the size of the depth maps using the example technique in FIG. 16. If a depth map is not received (e.g., the UAV 100 is no longer flying), the example process of FIG. 16 ends.

Figure 17:
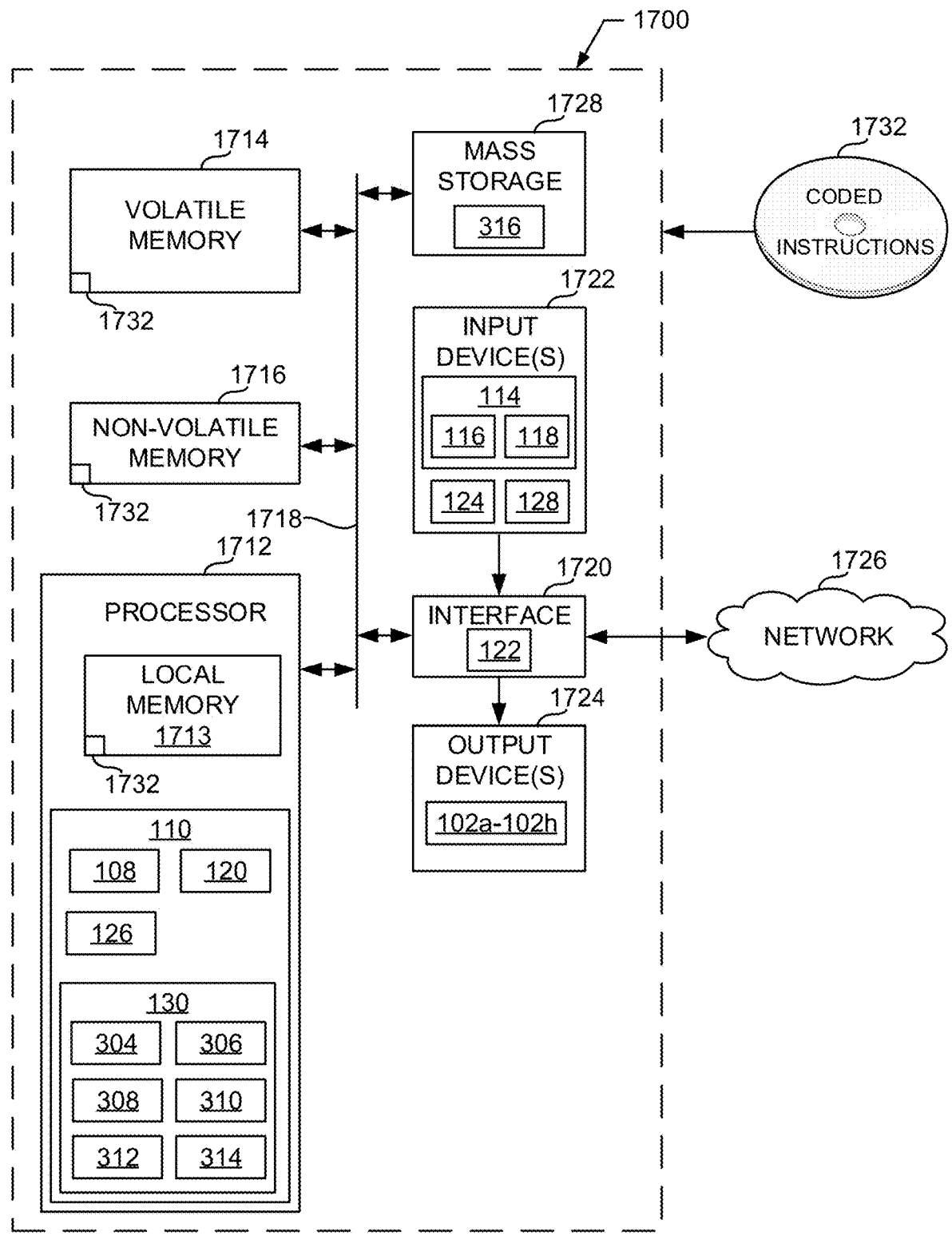
FIG. 17 is a processor platform structured to execute the example instructions of FIGS. 12, 13, 14, 15, and/or 16 to implement the example depth map modifier of FIGS. 1 and 3.

FIG. 17 is a block diagram of an example processor platform 1700 structured to execute the instructions of FIGS. 12-16 to implement the processor 110 and/or the depth map modifier 130 of FIGS. 1 and 3. The processor platform 1700 can be, for example, a printed circuit board, an aircraft (e.g., the UAV 100), or any other type of computing device (e.g., a ground controller, which may be implemented by a server, a personal computer, a workstation, a mobile device (e.g., a cell phone, a smart phone, a tablet such as an iPad), etc.).

The processor platform 1700 of the illustrated example includes a processor 1712. The processor 1712 of the illustrated example is hardware. For example, the processor 1712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 1712 may implement the example motor controller(s) 108, the example flight control system 120, the example collision avoidance system 126, the example depth map modifier 130, including any of the example block definer 304, the example pixel distance analyzer 306, the example resizer 308, the example pixel distance assignor 310, the example depth map complier 312, and/or the example high detail area definer 314, and/or, more generally, the example processor 110.

The processor 1712 of the illustrated example includes a local memory 1713 (e.g., a cache). The processor 1712 of the illustrated example is in communication with a main memory including a volatile memory 1714 and a non-volatile memory 1716 via a bus 1718. The volatile memory 1714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1716 may be implemented by flash memory and/or any other desired type of memory device. Access to the main memory 1714, 1716 is controlled by a memory controller.

The processor platform 1700 of the illustrated example also includes an interface circuit 1720. The interface circuit 1720 may be implemented by any type of interface standard, such as an Ethernet interface, a universal serial bus (USB), a Bluetooth® interface, a near field communication (NFC) interface, and/or a PCI express interface.

In the illustrated example, one or more input devices 1722 are connected to the interface circuit 1720. In this example, the input device(s) 1722 may include the example sensor system 114, including the example IMU 116 and/or the example GPS sensor 118, the example camera 124, and/or the example depth sensor(s) 128. Additionally or alternatively, the input device(s) 1722 may permit a user to enter data and/or commands into the processor 1712.

One or more output devices 1724 are also connected to the interface circuit 1720 of the illustrated example. In this example, the output device(s) 1024 may include the motors 102a-102h. Additionally or alternatively, the output device(s) 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. Thus, in some examples, the interface circuit 1720 may include a graphics driver card, a graphics driver chip and/or a graphics driver processor.

The interface circuit 1720 of the illustrated example also includes a communication device such as a transmitter, a receiver, a transceiver (e.g., the wireless transceiver 122), a modem, a residential gateway, a wireless access point, and/or a network interface to facilitate exchange of data with external machines (e.g., computing devices of any kind) via a network 1726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1700 of the illustrated example also includes one or more mass storage devices 1728 for storing software and/or data. Examples of such mass storage devices 1728 include floppy disk drives, hard drive disks, compact disk drives, Blu-ray disk drives, redundant array of independent disks (RAID) systems, and digital versatile disk (DVD) drives. The mass storage device may include, for example, the memory 316.

The machine executable instructions 1732 of FIGS. 12-16 may be stored in the mass storage device 1728, in the volatile memory 1714, in the non-volatile memory 1716, and/or on a removable non-transitory computer readable storage medium such as a CD or DVD.

From the foregoing, it will be appreciated that example methods, apparatus, systems, and articles of manufacture have been disclosed for reducing or downsizing depth maps to reduce the computational load imparted on collision avoidance systems while still ensuring high accuracy results can be achieved. As such, less computational power is needed to analyze the depth maps, thereby enabling smaller, lighter, processors to be used to implement the collision avoidance systems. Smaller, lighter processors are desirable with UAVs to reduce weight and reduce power consumption (which is limited in UAVs). Further, by reducing the computational loads on a processor, examples disclosed herein enable processor power to instead be used for other tasks. Examples disclosed herein can be implemented with collision avoidance systems used in any industry, such as on UAVs (fixed wing or rotorcraft), manned aircraft, autonomous driving vehicles (e.g., cars, trucks, etc.), robotics, etc.

Example methods, apparatus, systems, and articles of manufacture to reduce depth map size are disclosed herein. Further examples and combinations thereof include the following:

Example 1 includes an unmanned aerial vehicle including a depth sensor to generate a first depth map. The first depth map includes a plurality of pixels having respective distance values. The unmanned aerial vehicle of Example 1 also includes a depth map modifier to divide the plurality of pixels into blocks of pixels and generate a second depth map having fewer pixels than the first depth map based on distance values of the pixels in the blocks of pixels. The unmanned aerial vehicle of Example 1 further includes a collision avoidance system to analyze the second depth map.

Example 2 includes the unmanned aerial vehicle of Example 1, wherein the depth map modifier is to generate the second depth map by downsizing respective blocks into single pixels having assigned distance values corresponding to respective smallest distance values within the respective blocks.

Example includes 3 includes the unmanned aerial vehicle of Example 1, wherein, to generate the second depth map, the depth map modifier is to assign the smallest distance value in each block to a center pixel of the respective block, save the center pixels with the assigned smallest distance values, and discard the other pixels in the blocks.

Example 4 includes the unmanned aerial vehicle of Example 1, wherein the depth map modifier is to generate the second depth map by saving respective pixels from respective ones of the blocks having the smallest distance values in the respective blocks, and discarding the other pixels in the blocks.

Example 5 includes the unmanned aerial vehicle of Example 1, wherein the depth map modifier is to generate the second depth map by comparing a difference between the smallest distance value to a largest distance value in each block to a threshold distance.

Example 6 includes the unmanned aerial vehicle of Example 5, wherein, if the difference for a block satisfies the threshold distance, the depth map modifier is to assign the smallest distance value in the block to a center pixel in the block, save the center pixel, and discard the other pixels in the block. If the difference for a block does not satisfy the threshold distance, the depth map modifier is to save the pixel having the smallest distance value in the block and discard the other pixels in the block.

Example 7 includes the unmanned aerial vehicle of any of Examples 1-6, wherein the depth map modifier is to determine a direction of travel of the unmanned aerial vehicle, determine a high detail area and a low detail area within the plurality of pixels of the first depth map based on the direction of travel, and divide the pixels within the high detail area into blocks of pixels with a first size filter block and divide the pixels within the low detail area into blocks of pixels with a second size filter block having a larger size filter block than the first size filter block.

Example 8 includes the unmanned aerial vehicle of Example 7, wherein the depth sensor has a field of view, and the high detail area corresponds to a virtual cone projecting from the unmanned aerial vehicle in the direction of travel, the virtual cone being smaller than the field of view.

Example 9 includes the unmanned aerial vehicle of any of Examples 1-8, wherein the depth sensor is a first depth sensor, and further including a second depth sensor, the second depth sensor facing a different direction than the first depth sensor.

Example 10 includes the unmanned aerial vehicle of Example 9, wherein the second depth sensor is a generate a third depth map, the depth map modifier is to generate a fourth depth map based on the third depth map, the fourth depth map having fewer pixels than the third depth map, and the collision avoidance system is to analyze the fourth depth map.

Example 11 includes the unmanned aerial vehicle of any of Examples 1-10, wherein the collision avoidance system is to modify at least one of a trajectory or a velocity of the unmanned aerial vehicle if a potential collision is detected.

Example 12 includes method to reduce a size of a depth map, the method including applying, by executing an instruction with at least one processor, a filter block to a plurality of pixels of a first depth map to divide the plurality of pixels into blocks of pixels, where the pixels of the first depth map have respective distance values, identifying, by executing an instruction with the at least one processor, in the respective blocks, respective smallest distance values associated with the pixels in the respective blocks, and generating, by executing an instruction with the at least one processor, a second depth map based on the smallest distance values in the blocks of pixels, where the second depth map has fewer pixels than the first depth map.

Example 13 includes the method of Example 12, wherein the generating of the second depth map includes downsizing each block of pixels into one pixel having an assigned distance value corresponding to the smallest distance value within the block of pixels.

Example 14 includes the method of Example 12, wherein the generating of the second depth map includes assigning a smallest distance value in each respective block of pixels to a center pixel of the respective block, saving the center pixels with the assigned smallest distance values, and discarding the other pixels in the blocks.

Example 15 includes the method of Example 12, wherein the generating of the second depth map includes saving the pixels having the smallest distance values from the respective blocks of pixels, and discarding the other pixels in the blocks.

Example 16 includes the method of Example 12, wherein the generating of the second depth map includes determining, for each respective block, a difference between the smallest distance value and a largest distance value for the pixels in the respective block to determine differences for the respective blocks of pixels, and comparing the differences to a threshold distance. If the respective difference for a respective block satisfies the threshold distance, the method includes assigning the smallest distance value in the respective block to a center pixel in the respective block, saving the center pixel of the respective block, and discarding the other pixels in the respective block. If the respective difference for a respective block does not satisfy the threshold distance, the method includes saving the pixel having the smallest distance in the respective block, and discarding the other pixels in the respective block.

Example 17 includes the method of any of Examples 12-16, further including obtaining the first depth map with a depth sensor carried on a vehicle.

Example 18 includes the method of Example 17, further including determining, by executing an instruction with the at least one processor, a direction of travel of the vehicle, and identifying, by executing an instructions with the at least one processor, a high detail area and a low detail area within the first plurality of pixels based on the direction of travel, and wherein the applying of the filter block includes applying a first size filter block to the pixels within the high detail area and applying a second size filter block to the pixels within the low detail area, the second size filter block larger than the first size filter block.

Example 19 includes the method of Example 17, wherein the vehicle is an unmanned aerial vehicle.

Example 20 includes the method of Example 19, further including analyzing, via a collision avoidance system, the second depth map to monitor a location of an object near the unmanned aerial vehicle.

Example 21 includes a non-transitory machine readable storage medium including instructions that, when executed, cause one or more processors to at least apply a filter block to a first plurality of pixels of a first depth map to divide the first plurality of pixels into blocks of pixels, the first plurality of pixels having respective distance values, identify, in the respective blocks, respective smallest distance values associated with the pixel in the respective blocks, and generate a second depth map based on the smallest distance values in the blocks of pixels, where the second depth map have a second plurality of pixels, and the second plurality of pixels is less than the first plurality of pixels.

Example 22 includes the non-transitory machine readable storage medium of Example 21, wherein the instructions, when executed, cause the one or more processors to generate the second depth map by downsizing each block of pixels into one pixel having an assigned distance value corresponding to the smallest distance value within the block of pixels.

Example 23 includes the non-transitory machine readable storage medium of Example 21, wherein the instructions, when executed, cause the one or more processors to generate the second depth map by assigning a smallest distance value in each respective block of pixels to a center pixel of the respective block, saving the center pixels with the assigned smallest distance values, and discarding the other pixels in the blocks, the second plurality of pixels corresponding to the saved center pixels with the assigned smallest distance values.

Example 24 includes the non-transitory machine readable storage medium of Example 21, wherein the instructions, when executed, cause the one or more processors to generate the second depth map by saving the pixels having the smallest distance values from the respective blocks of pixels, and discarding the other pixels in the blocks, the second plurality of pixels corresponding to the saved pixels.

Example 2 includes the non-transitory machine readable storage medium of Example 21, wherein the instructions, when executed, cause the one or more processors to generate the second depth map by determining, for each respective block, a difference between the smallest distance value and a largest distance value for the pixels in the respective block to determine differences for the respective blocks of pixels, comparing the differences to a distance threshold, if the respective difference for a respective block satisfies the threshold distance, assigning the smallest distance value in the respective block to a center pixel in the respective block, saving the center pixel of the respective block, and discarding the other pixels in the respective block, and if the respective difference for a respective block does not satisfy the threshold distance, saving the pixel having the smallest distance in the respective block, and discarding the other pixels in the respective block.

Example 26 includes the non-transitory machine readable storage medium of any of Examples 21-25, wherein the first depth map is obtained by a depth sensor carried on a vehicle.

Example 27 includes the non-transitory machine readable storage medium of Example 26, wherein the instructions, when executed, cause the one or more processors to determine a direction of travel of the vehicle, identify a high detail area and a low detail area within the first plurality of pixels based on the direction of travel, and apply the filter block by applying a first size filter block to the pixels within the high detail area and applying a second size filter block to the pixels within the low detail area where the second size filter block is larger than the first size filter block.

Example 28 includes the non-transitory machine readable storage medium of Example 26, wherein the vehicle is an unmanned aerial vehicle.

Example 29 includes an apparatus including means for applying a filter block to a first plurality of pixels of a first depth map to divide the first plurality of pixels into blocks of pixels, the first plurality of pixels having respective distance values, means for identifying, in the respective blocks, respective smallest distance values associated with the pixel in the respective blocks, and means for generating a second depth map based on the smallest distance values in the blocks of pixels, where the second depth map has a second plurality of pixels, and the second plurality of pixels is less than the first plurality of pixels.

Example 30 includes the apparatus of Example 29, further including means for downsizing each block of pixels into one pixel having an assigned distance value corresponding to the smallest distance value within the block of pixels, and wherein the means for generating the second depth map is to generate the second depth map based on the downsized blocks of pixels.

Example 31 includes the apparatus of Example 29, further including means for assigning a smallest distance value in each respective block of pixels to a center pixel of the respective block, and wherein the means for generating the second depth map is to save the center pixels with the assigned smallest distance values and discard the other pixels in the blocks, where the second plurality of pixels corresponds to the saved center pixels with the assigned smallest distance values.

Example 32 includes the apparatus of Example 29, wherein the means for generating the second depth map is to save the pixels having the smallest distance values from the respective blocks of pixels and discard the other pixels in the blocks, where the second plurality of pixels corresponds to the saved pixels.

Example 33 includes the apparatus of Example 29, wherein the means for identifying is to determine, for each respective block, a difference between the smallest distance value and a largest distance value for the pixels in the respective block to determine differences for the respective blocks of pixels, and compare the differences to a distance threshold. If the respective difference for a respective block satisfies the threshold distance, a means for assigning is to assign the smallest distance value in the respective block to a center pixel in the respective block, and the means for generating the second depth map is to save the center pixel of the respective block and discarding the other pixels in the respective block. If the respective difference for a respective block does not satisfy the threshold distance, the means for generating the second depth map is to save the pixel having the smallest distance in the respective block and discard the other pixels in the respective block.

Example 34 includes the apparatus of any of Examples 29-33, further including means for obtaining the first depth map carried on a vehicle.

Example 35 includes the apparatus of Example 34, further including means for determining a direction of travel of the vehicle and means for identifying a high detail area and a low detail area within the first plurality of pixels based on the direction of travel, wherein the means for applying is to apply a first size filter block to the pixels within the high detail area and apply a second size filter block to the pixels within the low detail area, where the second size filter block is larger than the first size filter block.

Example 36 includes the apparatus of Example 34, wherein the vehicle is an unmanned aerial vehicle.

Example 37 includes an unmanned aerial vehicle system including an unmanned aerial vehicle having a depth sensor to obtain a first depth map, the first depth map including a plurality of pixels having respective distance values, a depth map modifier to divide the plurality of pixels into blocks of pixels and generate a second depth map having fewer pixels than the first depth map based on distance values of the pixels in the blocks of pixels, and a collision avoidance system to analyze the second depth map to track a location of an object relative to the unmanned aerial vehicle.

Example 38 includes the unmanned aerial vehicle system of Example 37, wherein the depth map modifier is implemented by a processor carried on the unmanned aerial vehicle.

Example 39 includes the unmanned aerial vehicle system of Examples 37 or 38, wherein the collision avoidance system is implemented by the processor carried on the unmanned aerial vehicle system.

Although certain example methods, apparatus, systems, and articles of manufacture have been disclosed herein, the scope of coverage of this patent is not limited thereto. On the contrary, this patent covers all methods, apparatus, systems, and articles of manufacture fairly falling within the scope of the claims of this patent.

What is claimed is:

1. An unmanned aerial vehicle comprising:
a depth sensor to generate a first depth map, the first depth map including a plurality of pixels having respective distance values;
a processor to:
divide the plurality of pixels into blocks of pixels; and
generate a second depth map having fewer pixels than the first depth map based on the distance values of the pixels in the blocks of pixels, the processor to generate the second depth map by saving respective pixels from respective ones of the blocks of pixels having the smallest distance values in the respective blocks of pixels and discarding the other pixels in the blocks of pixels; and
a collision avoidance system to analyze the second depth map.

2. An unmanned aerial vehicle comprising:
a depth sensor to generate a first depth map, the first depth map including a plurality of pixels having respective distance values;
a processor to:
divide the plurality of pixels into blocks of pixels; and
generate a second depth map having fewer pixels than the first depth map based on the distance values of the pixels in the blocks of pixels, the processor to generate the second depth map by downsizing the respective blocks of pixels into single pixels having assigned distance values corresponding to respective smallest distance values within the respective blocks of pixels; and
a collision avoidance system to analyze the second depth map.

3. An unmanned aerial vehicle comprising:
a depth sensor to generate a first depth map, the first depth map including a plurality of pixels having respective distance values;
a processor to:
divide the plurality of pixels into blocks of pixels; and
generate a second depth map having fewer pixels than the first depth map based on the distance values of the pixels in the blocks of pixels, the processor to generate the second depth map by assigning the smallest distance value in each block of pixels to a center pixel of the respective block of pixels, saving the center pixels with the assigned smallest distance values, and discarding the other pixels in the blocks of pixels; and
a collision avoidance system to analyze the second depth map.

4. An unmanned aerial vehicle comprising:
a depth sensor to generate a first depth map, the first depth map including a plurality of pixels having respective distance values;
a processor to:
divide the plurality of pixels into blocks of pixels; and
generate a second depth map having fewer pixels than the first depth map based on the distance values of the pixels in the blocks of pixels by comparing a difference between the smallest distance value to a largest distance value in each block of pixels to a threshold distance; and
a collision avoidance system to analyze the second depth map.

5. The unmanned aerial vehicle of claim 4, wherein:
if the difference for a block of pixels satisfies the threshold distance, the processor is to assign the smallest distance value in the block of pixels to a center pixel in the block of pixels, save the center pixel, and discard the other pixels in the block of pixels; and
if the difference for a block of pixels does not satisfy the threshold distance, the processor is to save the pixel having the smallest distance value in the block of pixels and discard the other pixels in the block of pixels.

6. An unmanned aerial vehicle comprising:
a depth sensor to generate a first depth map, the first depth map including a plurality of pixels having respective distance values;
a processor to:
determine a direction of travel of the unmanned aerial vehicle;
determine a high detail area and a low detail area within the plurality of pixels of the first depth map based on the direction of travel;
divide the pixels of the plurality of pixels within the high detail area into first blocks of pixels with a first size filter block;
divide the pixels of the plurality of pixels within the low detail area into second blocks of pixels with a second size filter block, the second size filter block having a larger size filter block than the first size filter block; and
generate a second depth map having fewer pixels than the first depth map based on the distance values of the pixels in the first and second blocks of pixels; and
a collision avoidance system to analyze the second depth map.

7. The unmanned aerial vehicle of claim 6, wherein the depth sensor has a field of view, and the high detail area corresponds to a virtual cone to be projected from the unmanned aerial vehicle in the direction of travel, the virtual cone being smaller than the field of view.

8. The unmanned aerial vehicle of claim 1, wherein the collision avoidance system is to modify at least one of a trajectory or a velocity of the unmanned aerial vehicle if a potential collision is detected.

9. A method to reduce a size of a depth map, the method comprising:
applying, by executing an instruction with at least one processor, a filter block to a plurality of pixels of a first depth map to divide the plurality of pixels into blocks of pixels, the pixels of the first depth map having respective distance values;
identifying, by executing an instruction with the at least one processor, in the respective blocks of pixels, respective smallest distance values associated with the pixels in the respective blocks of pixels; and
generating, by executing an instruction with the at least one processor, a second depth map based on the smallest distance values in the blocks of pixels, the second depth map having fewer pixels than the first depth map.

10. The method of claim 9, wherein the generating of the second depth map includes:
assigning a smallest distance value in each respective block of pixels to a center pixel of the respective blocks of pixels;
saving the center pixels with the assigned smallest distance values; and
discarding the other pixels in the blocks of pixels.

11. The method of claim 9, wherein the generating of the second depth map includes:
saving the pixels having the smallest distance values from the respective blocks of pixels; and
discarding the other pixels in the blocks of pixels.

12. The method of claim 9, wherein the generating of the second depth map includes:
   determining, for each respective block of pixels, a difference between the smallest distance value and a largest distance value for the pixels in the respective block of pixels to determine differences for the respective blocks of pixels;
   comparing the differences to a threshold distance;
   if the respective difference for a respective block of pixels satisfies the threshold distance:
      assigning the smallest distance value in the respective block of pixels to a center pixel in the respective block of pixels;
      saving the center pixel of the respective block of pixels; and
      discarding the other pixels in the respective block of pixels; and
   if the respective difference for a respective block of pixels does not satisfy the threshold distance:
      saving the pixel having the smallest distance in the respective block of pixels; and
      discarding the other pixels in the respective block of pixels.

13. The method of claim 9, further including obtaining the first depth map with a depth sensor carried on a vehicle.

14. The method of claim 13, wherein the vehicle is an unmanned aerial vehicle.

15. The method of claim 14, further including:
   analyzing, via a collision avoidance system, the second depth map to monitor a location of an object near the unmanned aerial vehicle.

16. A non-transitory machine readable storage medium comprising instructions that, when executed, cause one or more processors to at least:
   apply a filter block to a first plurality of pixels of a first depth map to divide the first plurality of pixels into blocks of pixels, the first plurality of pixels having respective distance values;
   identify, in the respective blocks of pixels, respective smallest distance values associated with the pixel in the respective blocks of pixels; and
   generate a second depth map based on the smallest distance values in the blocks of pixels, the second depth map having a second plurality of pixels, the second plurality of pixels less than the first plurality of pixels.

17. The non-transitory machine readable storage medium of claim 16, wherein the instructions, when executed, cause the one or more processors to generate the second depth map by downsizing each block of pixels into one pixel having an assigned distance value corresponding to the smallest distance value within the block of pixels.

18. The non-transitory machine readable storage medium of claim 16, wherein the instructions, when executed, cause the one or more processors to generate the second depth map by:
   assigning a smallest distance value in each respective block of pixels to a center pixel of the respective block;
   saving the center pixels with the assigned smallest distance values; and
   discarding the other pixels in the blocks of pixels, the second plurality of pixels corresponding to the saved center pixels with the assigned smallest distance values.

19. The non-transitory machine readable storage medium of claim 16, wherein the first depth map is obtained by a depth sensor carried on a vehicle.

20. The unmanned aerial vehicle of claim 1, wherein the collision avoidance system is implemented by the processor.

* * * * *